United States Patent
Chen et al.

(10) Patent No.: US 9,684,593 B1
(45) Date of Patent: *Jun. 20, 2017

(54) TECHNIQUES USING AN ENCRYPTION TIER PROPERTY WITH APPLICATION HINTING AND I/O TAGGING

(71) Applicant: EMC IP Holding Company LLC, Hopkinton, MA (US)

(72) Inventors: Xiangping Chen, Sherborn, MA (US); Xuan Tang, Hopkinton, MA (US); Qin Tao, Hopkinton, MA (US)

(73) Assignee: EMC IP Holding Company LLC

( * ) Notice: Subject to any disclaimer, the term of this patent is extended or adjusted under 35 U.S.C. 154(b) by 805 days.

This patent is subject to a terminal disclaimer.

(21) Appl. No.: 13/795,512

(22) Filed: Mar. 12, 2013

Related U.S. Application Data

(63) Continuation-in-part of application No. 13/690,069, filed on Nov. 30, 2012, now Pat. No. 9,436,834.

(51) Int. Cl.
| | |
|---|---|
| *G06F 12/0897* | (2016.01) |
| *G06F 12/0811* | (2016.01) |

(Continued)

(52) U.S. Cl.
CPC ...... *G06F 12/0811* (2013.01); *G06F 11/1469* (2013.01); *G06F 12/0897* (2013.01);
(Continued)

(58) Field of Classification Search
CPC .. G06F 12/0811; G06F 12/08; G06F 12/0802; G06F 12/0897; G06F 12/12;
(Continued)

(56) References Cited

U.S. PATENT DOCUMENTS

| | | | |
|---|---|---|---|
| 6,751,705 B1 * | 6/2004 | Solomon | G06F 12/0811 711/120 |
| 7,634,585 B2 * | 12/2009 | Conley | G06F 12/0866 710/1 |

(Continued)

OTHER PUBLICATIONS

INCITS Technical Committee T10, document No. 11-436R6 (revision 6) dated May 5, 2012, entitled SBC-3: LBA Access Hints, at www.t10.org.

(Continued)

*Primary Examiner* — Eleni Shiferaw
*Assistant Examiner* — Nelson Giddins
(74) *Attorney, Agent, or Firm* — Muirhead and Saturnelli, 1LC

(57) ABSTRACT

Techniques are described for storing data. A command is issued from a client to a data storage system. The data storage system includes a plurality of storage tiers comprising a first storage tier of physical storage devices and a second storage tier of physical storage devices, wherein data stored on any physical storage device of the first storage tier is stored in an encrypted form and data stored on any physical storage device of the second storage tier is not stored in an encrypted form. The command includes a hint indicating whether data stored at a first logical address range of a first logical device is stored in an encrypted form. The command is received at the data storage system. First data written to the first logical device at the first logical address range is stored on one or more physical storage devices of any of said first storage tier and said second storage tier in accordance with the hint.

20 Claims, 16 Drawing Sheets

(51) Int. Cl.
*G06F 11/14* (2006.01)
*G06F 12/128* (2016.01)
*G06F 12/14* (2006.01)
*G06F 12/02* (2006.01)
*G06F 12/08* (2016.01)

(52) U.S. Cl.
CPC ............ *G06F 12/128* (2013.01); *G06F 12/02* (2013.01); *G06F 12/08* (2013.01); *G06F 12/1441* (2013.01)

(58) Field of Classification Search
CPC .... G06F 12/128; G06F 12/1441; G06F 12/02; G06F 11/1469
See application file for complete search history.

(56) References Cited

U.S. PATENT DOCUMENTS

| | | | | |
|---|---|---|---|---|
| 7,693,877 | B1* | 4/2010 | Zasman | G06F 17/30221 707/662 |
| 7,788,702 | B1* | 8/2010 | Harris | G06F 21/6218 726/2 |
| 8,364,985 | B1* | 1/2013 | Subramanian | G06F 21/78 709/223 |
| 8,533,494 | B2* | 9/2013 | Harada | G06F 21/602 713/185 |
| 8,612,776 | B2* | 12/2013 | Hakamata | G06F 3/0605 713/193 |
| 8,700,896 | B1* | 4/2014 | Sobel | H04L 63/0428 709/203 |
| 8,756,687 | B1* | 6/2014 | Klein | G06F 21/80 713/194 |
| 9,141,829 | B2* | 9/2015 | Goto | G06F 21/52 |
| 2006/0010154 | A1* | 1/2006 | Prahlad | G06F 17/30197 |
| 2008/0104081 | A1* | 5/2008 | Mimatsu | G06F 17/30067 |
| 2008/0240434 | A1* | 10/2008 | Kitamura | G06F 21/80 380/255 |
| 2009/0063872 | A1* | 3/2009 | Tanaka | G06F 21/6227 713/193 |
| 2010/0031056 | A1* | 2/2010 | Harada | G06F 21/78 713/193 |
| 2010/0031062 | A1* | 2/2010 | Nishihara | G06F 21/88 713/193 |
| 2010/0131731 | A1* | 5/2010 | Yamamoto | G06F 3/0613 711/163 |
| 2010/0281230 | A1* | 11/2010 | Rabii | G06F 3/0605 711/165 |
| 2010/0299532 | A1* | 11/2010 | Okada | G11B 20/00086 713/189 |
| 2011/0072276 | A1* | 3/2011 | Lee | G06F 21/80 713/189 |
| 2011/0138115 | A1* | 6/2011 | Oh | G06F 12/0246 711/103 |
| 2011/0178988 | A1* | 7/2011 | Satoyama | G06F 3/0608 707/649 |
| 2011/0276806 | A1* | 11/2011 | Casper | G06F 21/602 713/189 |
| 2011/0286594 | A1* | 11/2011 | Resch | H04L 9/085 380/46 |
| 2011/0307658 | A1* | 12/2011 | Miwa | G06F 3/0605 711/114 |
| 2012/0079191 | A1* | 3/2012 | Jaquette | H04N 21/231 711/114 |
| 2012/0131248 | A1* | 5/2012 | Abali | G06F 13/24 710/264 |
| 2012/0151157 | A1* | 6/2012 | Sela | G06F 3/0607 711/154 |
| 2012/0185702 | A1* | 7/2012 | Hakamata | G06F 3/0605 713/189 |
| 2012/0226887 | A1* | 9/2012 | Culley | G06F 12/0246 711/202 |
| 2013/0086394 | A1* | 4/2013 | Shimmitsu | G06F 3/061 713/193 |
| 2013/0111221 | A1* | 5/2013 | Fujii | G06F 3/0604 713/193 |
| 2013/0117223 | A1* | 5/2013 | Niki | G06F 17/30221 707/610 |
| 2013/0254483 | A1* | 9/2013 | Iida | G06F 3/061 711/117 |
| 2013/0291127 | A1* | 10/2013 | Bergman | G06F 17/30 726/30 |
| 2014/0337566 | A1* | 11/2014 | Oh | G06F 12/0246 711/103 |

OTHER PUBLICATIONS

Sean C. Dolan, et al., U.S. Appl. No. 13/466,775, filed May 8, 2012, Performing Data Storage Optimizations Across Multiple Data Storage Systems.

\* cited by examiner

| LUN | Tiering preference(s) | Tiering requirement(s) | Encrypted status |
|-----|----------------------|------------------------|------------------|
| A | EFD | encryption/ SED | 0 |
| B | FC | encryption/SED | 1 |
| C | no encryption/non-SED | EFD | 0 |
| D | encryption/SED | EFD | 1 |

FIG. 4

| LUN, portion | Tiering preference(s) | Tiering requirement(s) | Encryption status |
|---|---|---|---|
| A, P1 | EFD | encryption/SED | 0 |
| A, P2 | FC | encryption/SED | 1 |
| A, P3 | no encryption/non-SED | EFD | 0 |

FIG. 5

TECHNIQUES USING AN ENCRYPTION TIER PROPERTY WITH APPLICATION HINTING AND I/O TAGGING

CROSS REFERENCE TO RELATED APPLICATIONS

This application is a continuation in part of U.S. patent application Ser. No. 13/690,069, filed Nov. 30, 2012, TECHNIQUES USING AN ENCRYPTION TIER PROPERTY IN A MULTI-TIERED STORAGE ENVIRONMENT, which is incorporated by reference herein.

BACKGROUND

Technical Field

This application generally relates to data storage, and more particularly to techniques used in connection with determining and performing data movements in a multi-tiered storage environment.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies, performance characteristics, and the like. The physical devices of a data storage system, such as a data storage array, may be used to store data for multiple applications.

SUMMARY OF THE INVENTION

In accordance with one aspect of the invention is a method of storing data comprising: issuing a command from a client to a data storage system, said data storage system including a plurality of storage tiers comprising a first storage tier of physical storage devices and a second storage tier of physical storage devices, wherein data stored on any physical storage device of the first storage tier is stored in an encrypted form and data stored on any physical storage device of the second storage tier is not stored in an encrypted form, said command including a hint indicating whether data stored at a first logical address range of a first logical device is stored in an encrypted form; receiving said command at the data storage system; and storing first data written to said first logical device in said first logical address range on one or more physical storage devices of any of said first storage tier and said second storage tier in accordance with said hint. The first data may be included in the command and may be a write command to write the first data to a target location that is the first logical address range of the first logical device. The target location of the write command may be implicitly used as a hint target location of the hint indicating whether data stored at the hint target location is stored in an encrypted form. The hint of the command may explicitly specify the first logical address range of the first logical device. The first data may not be included in the command, and wherein the first data may be write data of a second command that is a write command. The hint may identify any of a tiering requirement and tiering preference for data stored in the first logical address range of the first logical device. The first logical address range may be less than an entire logical address range for the first logical device. The entire logical address range of the first logical device may be partitioned into a plurality of portions, each of said plurality of portions being associated with a setting denoting any of a tiering requirement and tiering preference indicating whether data stored at said each portion is stored on one or more physical storage devices of a storage tier that stores data in an encrypted form. The client may be a host and the hint may be produced by an application that writes data to the first logical address range of the first logical device whereby the hint indicates that data written to the first logical address range of the first logical device is stored in an encrypted form. The data storage system may store the first data written to one or more locations in the first logical address range on one or more physical storage devices of the first storage tier. The first logical address range of the first logical device may be included in a logical object to which the application performs data operations. The object may be any of a file, a file system, and a directory. The hint may explicitly specify the first logical address range of the first logical device. The physical storage devices of the first storage tier may be self-encrypting drives providing for automatic encryption of data written to any of the physical storage devices of the first storage tier and automatic decryption of data read from any of the physical storage devices of the first storage tier. The hint of the command may indicate to store data of the first logical address range of the first logical device in encrypted form and the data storage system may store the first data on a first physical storage device of the first storage tier. The method may further include receiving at the data storage system, at a subsequent point in time after storing the first data on the first physical device, a second command including a second hint indicating that data stored in the first logical address range of the first logical device is not stored in encrypted form; and responsive to receiving the second command, relocating any data stored on the first physical storage device of the first storage tier to a second physical storage device of the second tier. The hint may be included in a header portion of the command. The hint may indicate to store the first data in an encrypted form and there may be insufficient available storage in the first storage tier to store the first data on one or more physical devices of the first storage tier. The method may further include performing an action in accordance with a policy defined on the data storage system. The policy may indicate to perform the action that is any of performing first processing including failing to write the first data and accordingly notifying the client, and performing second processing that may include encrypting the first data; writing the first data in encrypted form on a physical storage device of the second storage tier; and relocating the first data from the second storage tier to the first storage tier when physical storage within the first storage tier becomes available. The second processing may include relocating other data from the first storage tier to the second storage tier to thereby increase an amount of available storage on the first storage tier. The hint may be effective for a period of time indicated by said command. The hint may be effective for the first logical address range of said first logical device until another hint is subsequently received that specifies new hint information indicating whether data stored at the first logical address range of the first logical device is stored in an encrypted form.

In accordance with another aspect of the invention is a data storage system comprising: a plurality of storage tiers including a first storage tier of physical storage devices and a second storage tier of physical storage devices, wherein data stored on any physical storage device of the first storage tier is stored in an encrypted form and data stored on any physical storage device of the second storage tier is not stored in an encrypted form; a computer readable medium comprising code stored therein for: receiving a command from a client, said command including a hint indicating whether data stored at a first logical address range of a first logical device is stored in an encrypted form; and storing first data written to said first logical device in said first logical address range on one or more physical storage devices of any of said first storage tier and said second storage tier in accordance with said hint.

In accordance with another aspect of the invention is a computer readable medium comprising code stored thereon for storing data, the computer readable medium comprising code for: issuing a command from a client to a data storage system, said data storage system including a plurality of storage tiers comprising a first storage tier of physical storage devices and a second storage tier of physical storage devices, wherein data stored on any physical storage device of the first storage tier is stored in an encrypted form and data stored on any physical storage device of the second storage tier is not stored in an encrypted form, said command including a hint indicating whether data stored at a first logical address range of a first logical device is stored in an encrypted form; receiving said command at the data storage system; and storing first data written to said first logical device in said first logical address range on one or more physical storage devices of any of said first storage tier and said second storage tier in accordance with said hint.

BRIEF DESCRIPTION OF THE DRAWINGS

Features and advantages of the present invention will become more apparent from the following detailed description of exemplary embodiments thereof taken in conjunction with the accompanying drawings in which:

FIGS. 4-5 are examples of tiering preferences, tiering requirements and encryption status indicators that may be specified for LUNs and data portions of LUNs in an embodiment in accordance with techniques herein;

DETAILED DESCRIPTION OF EMBODIMENT(S)

Figure 1:
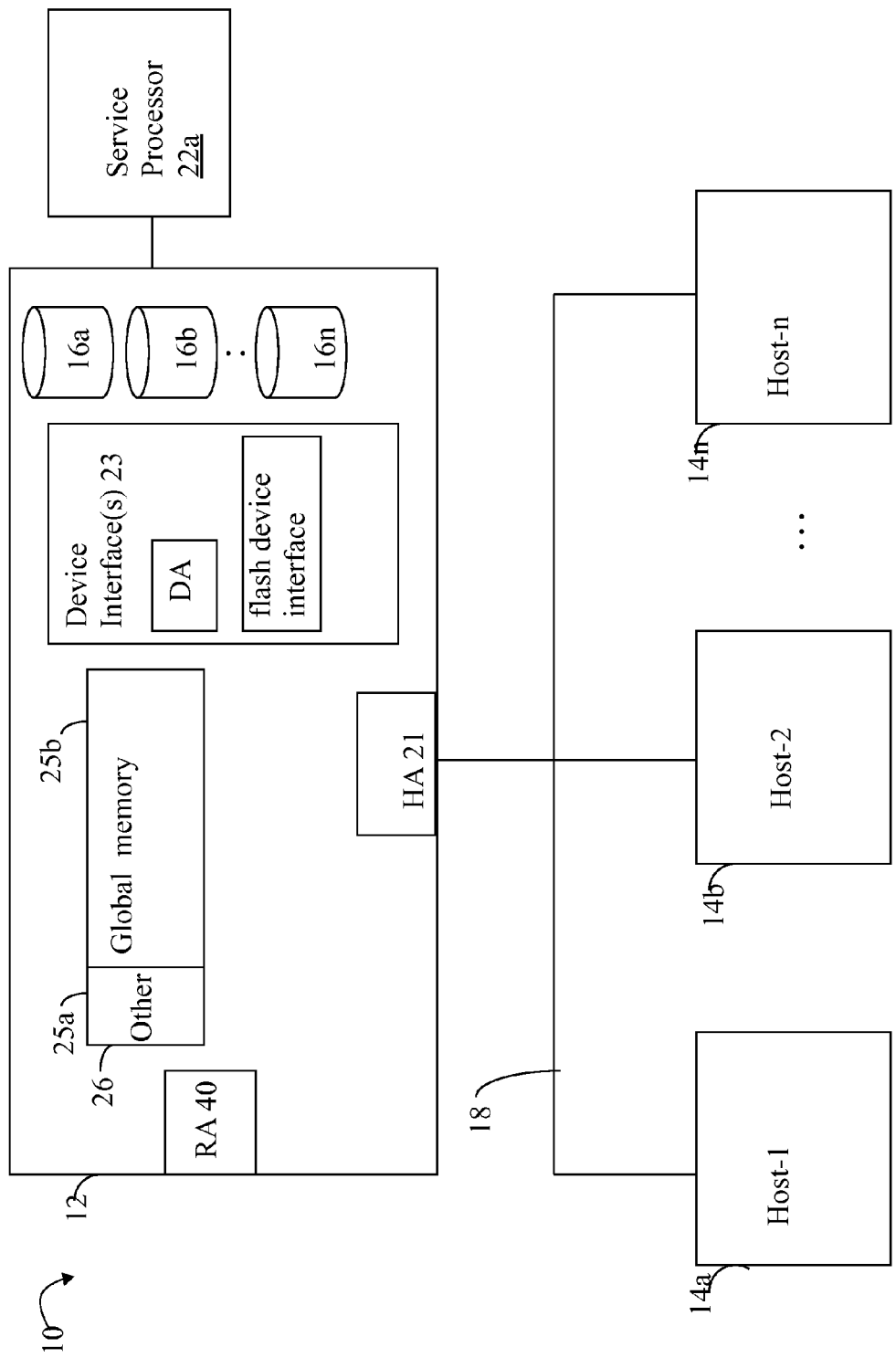
FIGS. 1 and 8 are examples of embodiments of systems that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical units (LUNs), or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

With reference to FIG. 1, components of the data storage system may communicate using GM 25b. For example, in connection with a write operation, an embodiment may first store the data in cache included in a portion of GM 25b, mark the cache slot including the write operation data as write pending (WP), and then later destage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be aVNX™ data storage array or system by EMC Corporation of Hopkinton, Mass. In the foregoing data storage array, the data storage devices 16a-16n may include a combination of disk devices and flash-based (or SSD-based) physical storage devices where the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes or properties. The attributes may include any one or more of a storage type or storage technology, device performance characteristic(s), RAID configuration (e.g., RAID-0, RAID-1, RAID-5, RAID-6), storage capacity, and the like. The storage type or technology may specify whether a physical storage device is an SSD drive (such as a flash drive), a particular type of SSD drive (such using flash or a form of RAM), a type of rotating magnetic disk or other non-SSD drive (such as an FC disk drive, a 10K RPM FC disk drive, a 15K RPM FC disk drive, a SATA (Serial Advanced Technology Attachment) drive), SAS (Serial Attached SCSI), and the like. Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. In terms of general expected performance, the SSD or flash tier may be considered the highest performing tier. The FC drives may be considered the second or next highest performing tier and the SATA drives may be considered the lowest or third ranked tier in terms of expected performance. The foregoing are some examples of tier definitions and other tier definitions may be specified in accordance with techniques herein.

In accordance with techniques herein, a tier definition for physical devices may include an attribute which identifies whether the physical devices of the storage tier store data in an encrypted form. An embodiment in accordance with techniques herein may include one or more storage tiers of self encrypting drives (SEDs) described in more detail below and also known in the art. A storage tier including SEDs may accordingly have an attribute setting of SED or encryption denoting that the physical drives of the tier store data in an encrypted form. A storage tier attribute such as SED indicating whether a storage tier includes drives which store data in an encrypted form may be included in a set of one or more attributes specified for each storage tier. In other words, an embodiment in accordance with techniques herein may include a set of one or more attributes for each storage tier including an attribute such as SED which indicates whether physical drives of the tier store data in an encrypted form. The SED attribute for a storage tier may be included with one or more additional attributes characterizing physical devices of the storage tier. An embodiment may use an SED drive, such as a commercially available SED drive by Seagate.

As described in more detail herein, the SED attribute or property as may be associated with a storage tier may denote whether physical devices of the tier provide "data at rest encryption" whereby encryption may be provided, for example, by hardware-based, on array, back-end encryption. More generally, the SED attribute for a storage tier may identify whether data stored on physical devices of the storage tier is in an encrypted form.

An SED drive may be characterized in that it has self encryption capabilities whereby data written to an SED drive is stored on the SED drive in an encrypted form. Also, the SED may include data decryption capabilities so that when data stored in its encrypted form on the SED drive is read, the encrypted data is then automatically decrypted prior to be being provided for subsequent use, such as to service a read request from a host. Some embodiments may use an SED drive in which the encrypting and decrypting functionality may be enabled through use of authentication or security related data which is provided when the SED drive is installed as a physical device for use in a data storage system. The data storage system may provide such authentication or security related data unique to each SED drive (such as part of SED and/or data storage system installation) to enable the SED drive to perform the encryption when writing data and decryption when reading data from the SED drive. If an SED is installed for use on a data storage system and such authentication or security related data is not provided, any encrypted data currently stored on the SED would not be decrypted such as in connection with reading data from the SED. In this manner, if the SED is lost or stolen, an unauthorized party is unable to read any encrypted data stored on the SED without also providing the authentication or security related data for that particular SED.

An embodiment in accordance with techniques herein may include a data storage system, such as a single data storage array, in which the system includes both SED and non-SED drives. In this manner, the encryption/decryption functionality of the SED drives to store data on the physical devices in an encrypted form may be treated as attribute or property of a storage tier in a similar manner to which other drive attributes or properties (e.g., drive technology and other performance characteristics) may be used in forming storage tiers.

SED drives may be used, for example, for storing sensitive or confidential data such as may be needed in connection with security regulations, for data theft prevention, and the like. As such, in some embodiments, not all data may need to be stored on SEDs but only selected sets of data. For example, a data storage system may store data for both a finance department and engineering department. Some or all data of the finance department may need to be stored on SEDs due to its sensitive nature for regulatory compliance. In contrast, none of the engineering data may need to be stored on SEDs and therefore stored on non-SED drives.

An SED drive may be a drive having any suitable storage technology, such as SSD (e.g., such as a flash-based storage) or non-SSD (e.g., FC, SATA, and the like). Thus, an embodiment may define a storage tier having the SED attribute in combination with one or more other attributes denoting the drive technology, drive performance characteristics, and the like. In accordance with techniques herein, one or more tiers may be defined comprising SEDs. Such SED-based tier(s) may be defined in combination with one or more non-SED-based tiers. In this manner, a drive may be characterized as having an encryption property denoting whether the physical drive is an SED or not, or more generally, denoting whether data stored on the physical devices of the tier are stored in an encrypted form. An embodiment may define a storage tier which includes drives based on encryption property alone, or in combination with, other properties. For example, an embodiment may define a single tier of all physical devices which are SEDs thereby having the encryption property independent of any other drive property. An embodiment may also define multiple storage tiers of SEDs where the encryption property in combination with one or more other properties (e.g. such a drive technology or performance characteristics) are used to characterize drives of a particular tier. For example, an embodiment may have the following tiers: a first tier of EFD drives which are non-SED drives, a second tier of EFD drives which are SEDs, a third tier of FC drives (rotating disk drives) which are non-SED drives and a fourth tier of FC drives which are SED drives.

A storage pool may be defined as a logical group of physical devices. In an embodiment in accordance with techniques herein, a logical device or unit, such as a LUN, may be configured from physical devices of a storage pool. A storage pool may be heterogeneous including multiple different tiers of physical devices. One or more LUNs may be created from a single storage pool whereby different data portions of a single LUN may be located on different physical devices of the pool. Furthermore, such different data portions of the single LUN may be stored on different physical devices of different storage tiers as described in more detail in following paragraphs. A LUN or other logical device having storage provisioned from a storage pool may be any suitable type of logical device or entity supported in an embodiment. For example, a LUN may be a thin or virtually provisioned LUN, a thick or regular LUN, and the like. Generally, a thick or regular LUN may have storage provisioned for the entire LUN's capacity when the LUN is created. In other words, storage may be allocated from the pool for the LUN's entire logical address space when the LUN is created. In contrast, thin or virtually provisioned (VP) LUNs use a capacity on demand model whereby storage may not be provisioned for the entire LUN's address space when the LUN is created. Rather, storage may be provisioned for a portion of the LUN's address space when there is an initial write to the logical address space. The granularity or the amount of storage provisioned at a time for virtually provisioned LUN may vary with embodiment. Thus, at any point in time, not all portions of the logical address space of a virtually provisioned device may be associated or mapped to allocated physical storage depending on which logical addresses of the virtually provisioned LUN have been written to at a point in time.

Figure 2:
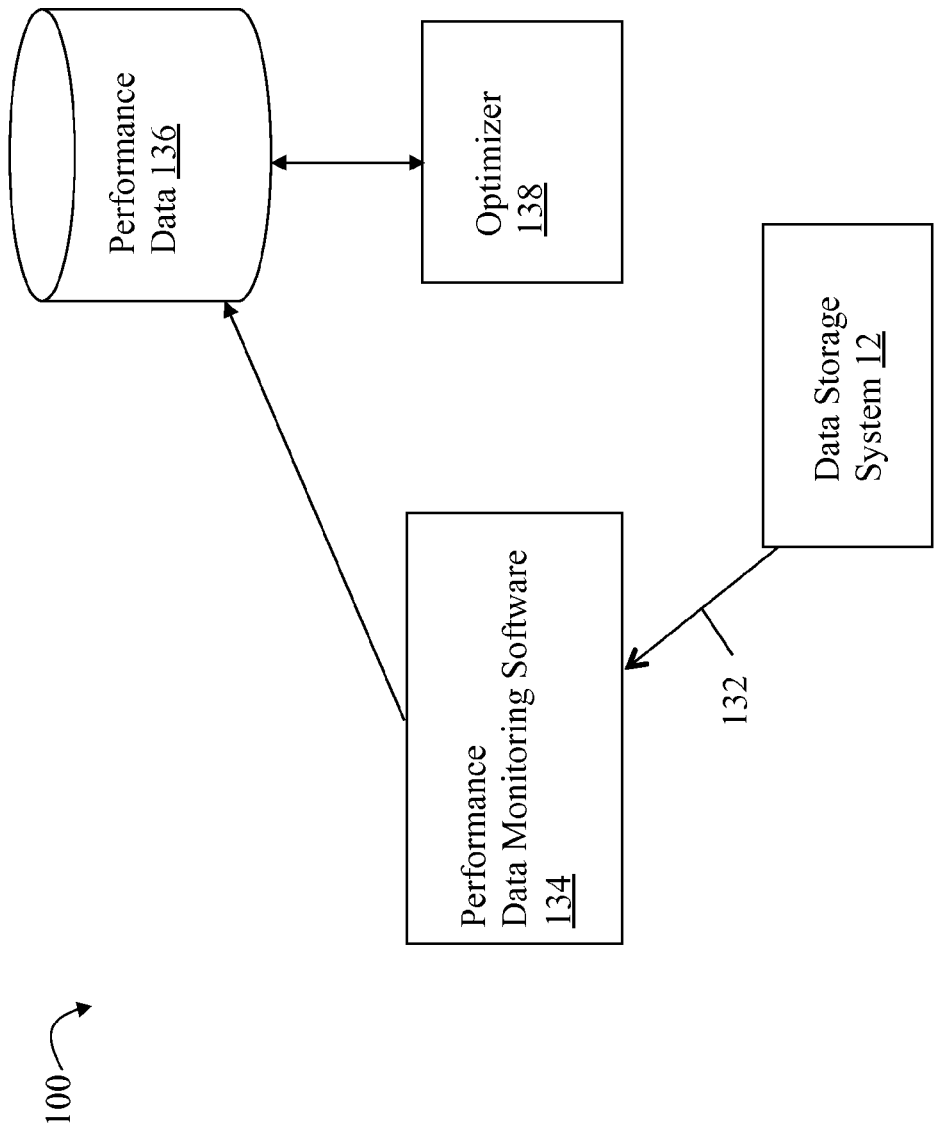
FIG. 2 is an example of components that may be used in connection with perform data movements in an embodiment in accordance with techniques herein.

Referring to FIG. 2, shown is an example 100 of software that may be used in connection with techniques herein. One or more of the components and associated functionality illustrated in FIG. 2 may be located on the service processor 22a, data storage system and/or embodied in any other suitable physical component(s). It should be noted that the service processor may be any one of a variety of commercially available processors, such as an Intel-based processor, and the like. For example, elements 134, 138 and 136 may be included in the service processor 22a in one embodiment.

The example 100 includes performance data monitoring software 134 which gathers performance data 136 about the data storage system 12 through the connection 132. The performance data monitoring software 134 gathers and stores performance data 136 which is input to the optimizer 138. This performance data 136 may serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics characterizing the workload or activity of data portions as may be used in an embodiment in accordance with techniques herein. The optimizer may access the performance data, for example, collected for a plurality of logical devices when performing a data storage optimization. The performance data 136 may be used in determining a workload for one or more physical devices, logical devices (e.g., LVs or LUNs), portions of logical devices (e.g., gather performance data and determine workload or level of activity for granularity that is less than an entire logical device), and the like. For example, in one embodiment, the data storage optimizer may perform data movement optimization based on the dynamically changing workload of data portions which are 1 GB slices or data portions. In this manner, the optimizer may determine workload for each such slice (slice-level granularity) and may perform data movement in slice units or other suitable size granularity. The workload may also be a measurement or activity level of "how busy" a device (or data portion thereof) is, for example, in terms of I/O operations (e.g., I/O throughput such as number of I/Os/second, response time (RT), average data transfer rate (e.g., bytes/second), and the like).

The response time for a storage device or volume may be based on a response time associated with the storage device or volume for a period of time. The response time may be based on read and write operations directed to the storage device or volume. Response time represents the amount of time it takes the storage system to complete an I/O request (e.g., a read or write request). Response time may be characterized as including two components: service time and wait time. Service time is the actual amount of time spent servicing or completing an I/O request after receiving the request from a host via an HA 21, or after the storage system 12 generates the I/O request internally. The wait time is the amount of time the I/O request spends waiting in line or queue waiting for service (e.g., prior to executing the I/O operation).

It should be noted that the operations of read and write with respect to a logical or physical device may be viewed as read and write requests or commands from the DA 23, controller or other backend physical device interface. Thus, these are operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 138 may perform processing to determine which data portions of one or more applications to locate on physical storage devices in a multi-tiered environment. It should be noted that the optimizer 138 may generally represent one or more components that perform processing as described herein as well as one or more other optimizations and other processing that may be performed in an embodiment. The optimizer 138 may, more generally, be referred to as a data movement module which provides for movement of data between storage tiers in accordance with data movement criteria. Generally, the optimizer may locate the most active data portions in the highest performance tiers and the less active data to lower performance tiers. As the activity or workload of data portions change over time, the optimizer may gather updated performance data reflecting such changes in workload and accordingly relocate data portions as needed based on such workload changes. For example, at a first point in time, a first data portion may have a first workload or activity level which is higher than a second workload or activity level of a second data portion. At the first point in time, the optimizer may locate the first data portion on an EFD tier and the second data portion on a lower performing FC or SATA tier. At a second later point in time, the workload of both the first and second data portions may change so that the first data portion now has approximately the second workload or activity and the second data portion has approximately the higher first workload or activity. At the second point in time, the optimizer may perform a data movement optimization based on this change in workload and move or relocate the first data portion to the FC or SATA tier and also move or relocate the second data portion to the EFD tier.

Thus, generally, the optimizer may gather data or statistics providing a measure of the activity or workload of a data portion. The optimizer may collect such data and perform analysis of the workload or activity of the data portions at various points in time, such as once per hour, to determine a ranking of the data portions in terms of activity relative to other data portions (for the same and different LUNs) of the pool. The data storage optimizer may provide for automatic relocation and data movement of data portions to different storage tiers in the pool based on data movement criteria and policies that may be included in an embodiment. For example, a policy option of automated tiering may be specified on a per LUN basis so that data portions of the LUN are located to different storage tiers based on the foregoing activity ranking. For example, the "hottest" or most active portions of the LUN having the highest workload are located in the highest performing available tier while placing portions of the LUN with lower activity on the lower performing tiers. The foregoing is one such policy that may be in effect for a LUN as may be included in an embodiment. It should be noted that an embodiment may also include one or more other policy options that may be specified for each LUN affecting where data of the LUN is located or placed. An embodiment may use a data storage optimizer such as, for example, EMC® Fully Automated Storage and Tiering for Virtual Pools (FAST VP) by EMC Corporation, providing functionality as described herein for such automated evaluation and data movement optimizations. For example, different techniques that may be used in connection with the data storage optimizer are described in U.S. patent application Ser. No. 13/466,775, filed May 8, 2012, PERFORMING DATA STORAGE OPTIMIZATIONS ACROSS MULTIPLE DATA STORAGE SYSTEMS, which is incorporated by reference herein.

Data portions of a LUN may be initially placed or located in a storage tier based on an initial placement or allocation policy. Subsequently, as data operations are performed with respect to the different data portions and data collected, data portions may be automatically relocated or placed in different storage tiers having different performance characteristics as the observed workload or activity of the data portions change over time.

Thus, the data storage optimizer may move or relocate data portions between different storage tiers having particular performance characteristics based on the activity of the data portions. In a similar manner, the data storage optimizer, or more generally a data movement or relocation module, may also move or relocate data portions between different storage tiers (each of which are identified as having or not having the encryption property) based on whether the data portions need to be stored in an encrypted form. In other words, if the data portion needs to be stored in an encrypted form, the data portion is placed on one or more physical devices included in a tier identified as having the SED property. Otherwise, the data portion is placed on one or more physical devices of storage tiers indicated as non-SED. The data movement module may perform processing to determine in which storage tier to locate data portions based on criteria including whether the data needs to be stored in an encrypted form or not. The criteria may also include performing data movements between different storage tiers based on activity level of the data portions at different points in time. It should be noted that although examples may be provided in which the criteria used to determine what storage tier to locate or place a data portion may include both of the foregoing. However, the techniques herein may more generally be performed in an embodiment in which the criteria used to determine appropriate storage tiers for data portions may include whether the data needs to be stored in an encrypted form alone, or optionally in combination with one or more other criteria such as based on activity or workload (e.g., whereby the most active are stored in the highest performing tiers).

Figure 3A:
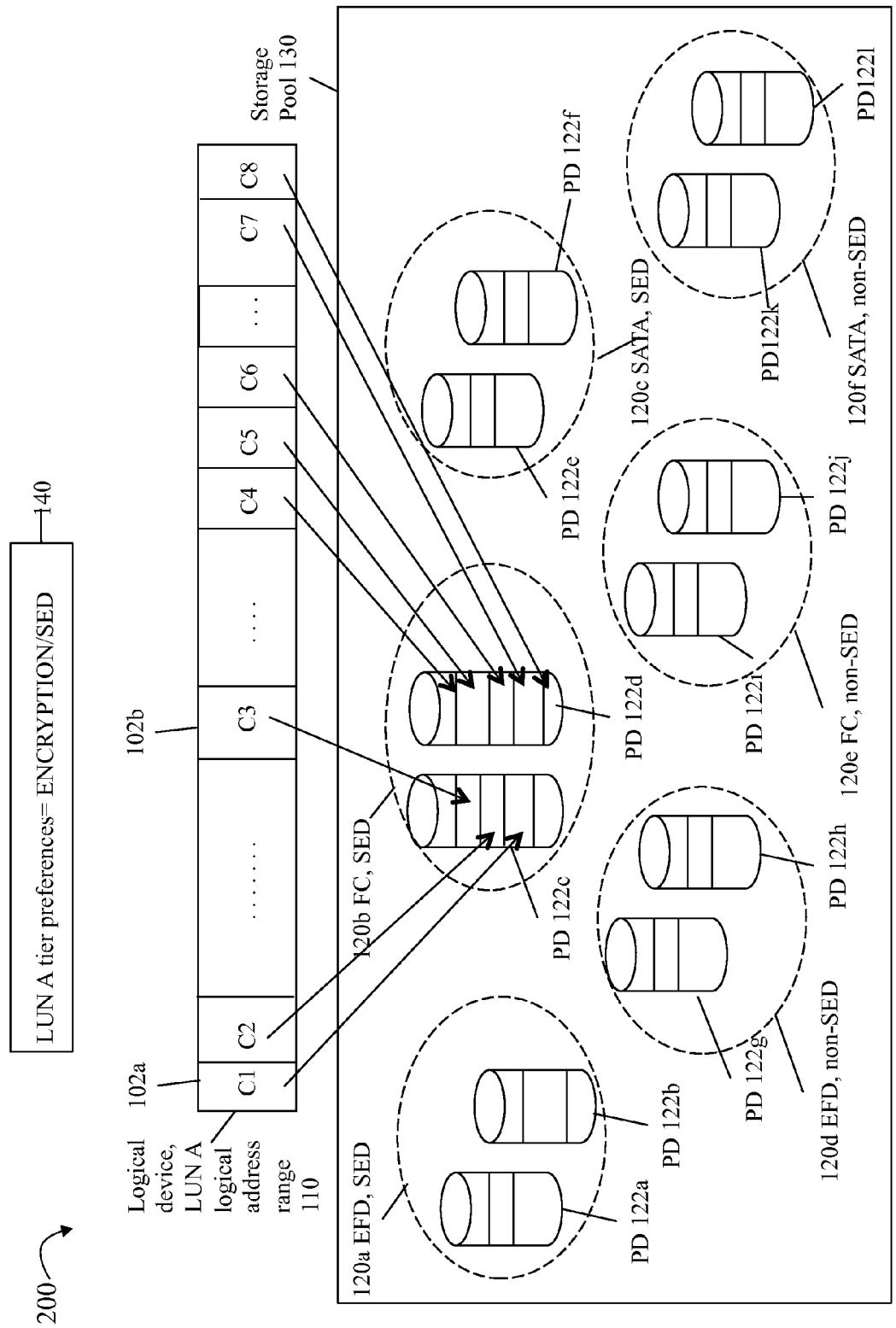
FIGS. 3A, 3B and 3C are examples illustrating use of techniques herein for performing data movement between encrypted/SED and non-SED-based/non-encrypted tiers in an embodiment in accordance with techniques herein.

Referring to FIG. 3A, shown is an example of a storage pool including a plurality of storage tiers as may be used in connection with techniques herein. The example 200 includes a storage pool 130 including physical devices (PDs) 122*a*-122*l* of 6 different storage tiers 120*a*-120*f*. In this example, each storage tier may be characterized by multiple attributes or properties including a first attribute denoting whether the storage tier comprises SED drives, or more generally denoting whether data is stored in encrypted form on physical devices of the tier. The multiple attributes of each tier also include a second attribute denoting the drive type or technology as one of EFD, FC or SATA.

In this example, the 6 storage tiers in the pool 130 may include: tier 120*a* of EF, SED physical devices (PDs) 122*a*-*b*, tier 120*b* of FC, SED PDs 122*c*-*d*, tier 120*c* of SATA, SED PDs 122*e*-*f*, tier 120*d* of EFD, non-SED PDs 122*g*-*h*, tier 120*e* of FC, non-SED PDs 122*i*-*j* and tier 120*f* of SATA, non-SED PDs 122*k*-*l*.

Element 110 may represent a logical address range of a logical device, such as a LUN A, configured from the pool 130 denoting where different portions of data of the logical address range are physical stored on devices in the storage pool 130. Each of the square units or elements, such as 102*a* and 102*b*, included in 110 may denote a data portion, such as a slice or other appropriately sized portion of the logical address space of LUN A. LUN A may be a thick or virtually provisioned device. If LUN A is a thick device, each portion of the logical address space 110 may be mapped to a portion of physical storage. If LUN A is a virtually provisioned device, each portion of the logical address space 110 may or may not be mapped to a portion of physical storage depending on whether any data has been stored or written to the logical address space portions. For purposes of illustration, assume that LUN A is a thick LUN having storage allocated for all its data portions from a default tier such as the non-SED SATA tier data portions even though such mapping is only denoted for some particular data portions denoted C1-C8.

Element 140 may indicate one or more tiering preference settings for the LUN. In this example, tiering preferences indicating that data portions of the LUN are to be stored on SED tiers, or more generally, stored in tiers which store data in an encrypted form. More generally, a tiering preference for storing data portions of the LUN may be specified where the preference may be denote one or more preferred properties of a storage tier where data portions of the LUN are stored. In one embodiment the preferences may denote, for example, desired performance characteristics, drive technology (e.g., SSD or rotating disk), drive type (e.g., SATA, EFD, FC) and may also identify whether it is preferred to store data portions of the LUN on an SED where the data portions are thereby stored in encrypted form on the drive. In this example of FIG. 3A, only the encryption SED preference is indicated. The particular tier to which each portion of the LUN A's logical address space is initially mapped may be specified, for example, using a configuration default, using another policy setting, and the like.

Element 140 may represent a tiering preference specified on a per LUN basis when the LUN is created so that, for example, storage may be initially provisioned from a default storage tier having the SED or encryption attribute set. Initially, data portions of the LUN A may be allocated from a default tier having the SED property, such as tier 120*b* (SED, FC). It should be noted that all portions of 110 may be initially mapped to physical storage in tier 120*b* although such mapping is only illustrated for portions C1-C8 for simplicity in illustration.

It should also be noted that although this example illustrates only a single LUN A having storage allocated from the pool 130, multiple LUNs may simultaneously have their physical storage similarly allocated from the same PDs of the same storage pool 130.

Thus, FIG. 3A may represent a mapping of where data portions corresponding to the LUN A's logical address space are located (e.g., in what storage devices of what storage tiers) at a first point in time.

After a time period, information regarding the activity or workload of the data portions of LUN A may be obtained based on gathered data as described elsewhere herein. Based on the activity or workload of the data portions, the data portion may be relocated or moved to a different storage tier than the tier 120b. In accordance with techniques herein, such data movement or relocation may be based on criteria including the workload or activity of the data portions and also the tier preference specified in 140. In this manner, the data storage optimizer may, for example, perform data movement optimizations to move or relocate data portions of LUN A based on the changing workload of such data portions. Such data portions may be moved between different ones of storage tiers 120a-120c having the SED attribute set thereby providing for storing the data of LUN A in encrypted form and also providing for data movement optimization based on changing data portion workloads. An exemplary illustration of where data portions may be relocated subsequent to the arrangement of FIG. 3A is now described in connection with FIG. 3B.

Figure 3B:
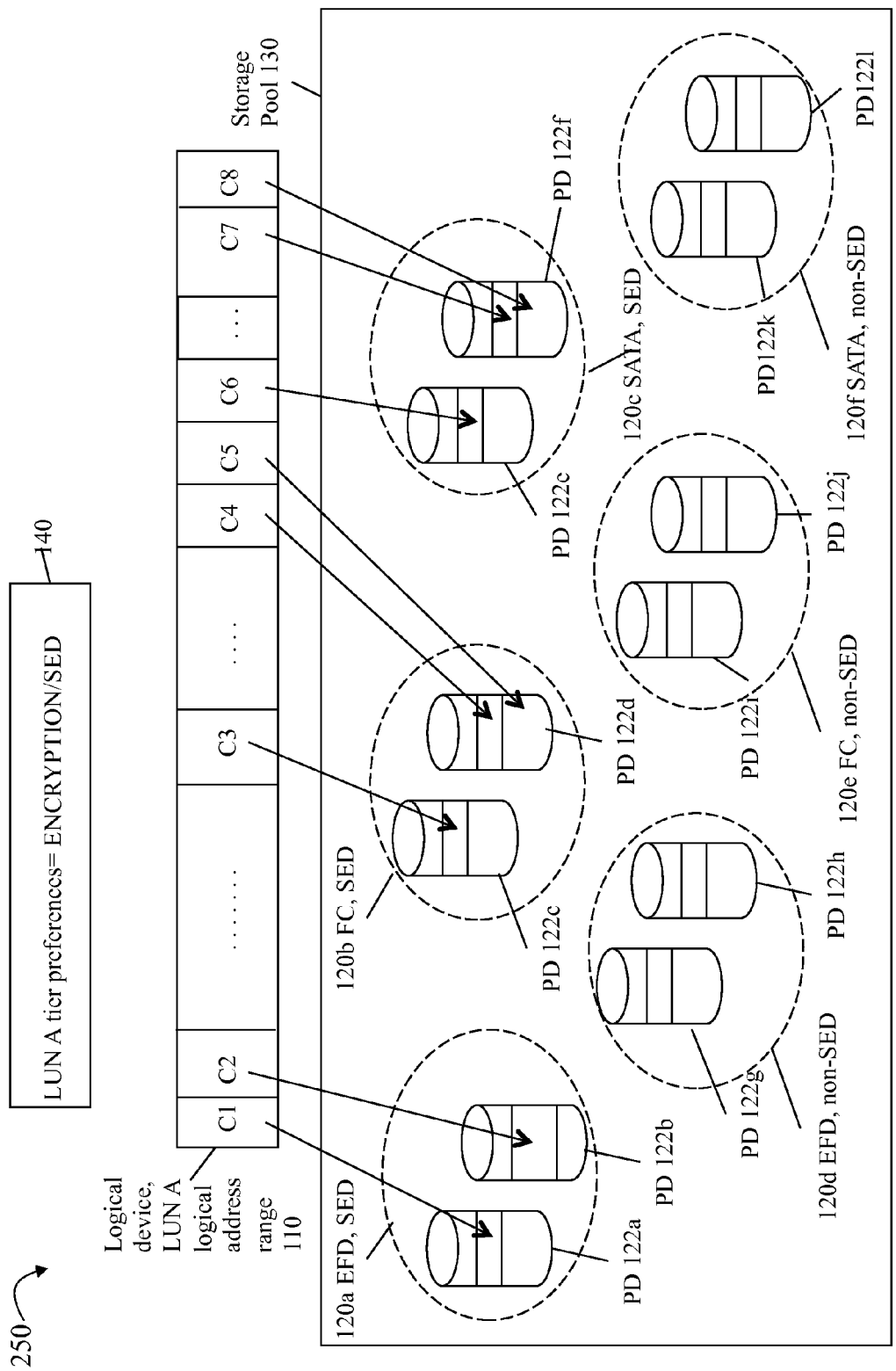

Referring to FIG. 3B, shown is an example 250 illustrating where some of the data portions of LUN A may be stored at a second point in time in accordance with the activity or workload of the data portions in an embodiment in accordance with techniques herein. FIG. 3B may represent a snapshot of where data portions of LUN A are stored subsequent to that as illustrated in FIG. 3A. In other words, the data storage optimizer may collect data regarding the activity or workload of the data portions of LUN A and accordingly relocate some of the data portions of LUN A as now illustrated in FIG. 3B. In this case due to the SED/encryption tiering preference of 140, the data storage optimizer may locate the LUN A's data portions on any of the 3 storage tiers of SED (e.g., EFD-SED tier 120a, FC-SED tier 120b, SATA-SED tier 120c). In an embodiment in which the data storage optimizer performs automated data movement and placement of data portions based on activity level of the data portions, the data storage optimizer may move data portions of the LUN A between any of these three SED-based storage tiers 120a-c as the activity level of the data portions may change over time. In a similar manner if no encryption or non-SED is specified as a preferred property in 140 for storing data of the LUN, the data storage optimizer may then move data portions of the LUN between any of the three non SED-based storage tiers 120d-f as the activity level of the data portions may change over time.

With reference to FIG. 3B, consider selected portions C1-C8. Portions C1 and C2 may be very active and stored in PDs of tier 120a. Portions C6, C7 and C8 may have relatively little activity or workload (e.g., may be cold, relatively idle or inactive) in comparison to other portions C1-C5 and therefore portions C6-C8 may be stored in tier 120c. Portions C3, C4, and C5 may have a level of workload or activity greater than C6-C8 but also less than C1 and C2 and therefore portions C3-C5 may be stored in tier 120b.

In this manner, specifying SED or non-SED as a property preference for a LUN may indicate a first dimension of the physical devices upon which the data portions of the LUN may be located by the data storage optimizer. Other properties, such as drive type (e.g., SATA, EFD, FC), may serve as a second dimension of a lower priority. For example, as a variation to FIG. 3B, consider LUN A where property preferences indicate SED and also EFD. In this case, the data of the LUN may be located on any tier having the first dimensional property of SED and also the second dimensional property of EFD. If a second dimension property preference for a LUN is specified which identifies a drive type (e.g., SATA, EFD, FC), the combination of property preferences of both the first and second dimensions may be used to identify a prioritized list in which storage tiers are considered for storing the data portions of the LUN. The first dimension property of SED/encryption may be used as primary criteria when evaluating and selecting data movement alternatives, and the second dimension of EFD may be used as secondary criteria in combination with the primary criteria. Depending on the embodiment, the data storage optimizer may consider such property preferences in combination with activity level of the data portions, overall system performance, and/or other criteria when deciding where (e.g., in what storage tier(s)) to locate data portions of the LUN.

In an embodiment in accordance with techniques herein, the first dimensional property of SED may be used as first or primary criteria for performing data movement and location and the second dimensional property of drive technology or type may be used as a secondary ranking criteria for performing data movement and location. For example, there may be an insufficient amount of EFD SED available capacity in 120a to store all the data portions of LUN A. In this case, the optimizer may place all LUN A data portions on other SED-based tiers 120b, 120c in accordance with the primary criteria since there is sufficient available storage across the SED-based tiers 120a-c to store all of LUN A's data portions. The optimizer may also perform data placement of LUN A's data portions in accordance with the secondary criteria indicated by the EFD preference by placing the busiest or most active data portions of LUN A in tier 120a and then place any remaining data portions of LUN A in the next highest performance SED-based tier having available capacity, such as tier 120b. In this manner, the optimizer attempts data placement using the tiering preferences where such data placement first attempts to both primary and secondary criteria in connection with data placement. If both primary and secondary criteria cannot be satisfied, the optimizer attempts to satisfy the primary criteria (e.g., SED property) and then attempts to satisfy the secondary criteria (e.g., EFD property). Additionally, the optimizer may consider workload or activity of different data portions when determining which of the data portions to place in the different SED-based tiers 120a-c. For example, since there is insufficient available SED EFD storage capacity in tier 120a, the optimizer selects the data portions have the highest workload for storing in tier 120a and then stores any remaining portions in the next highest performing SED-based tier.

Figure 3C:
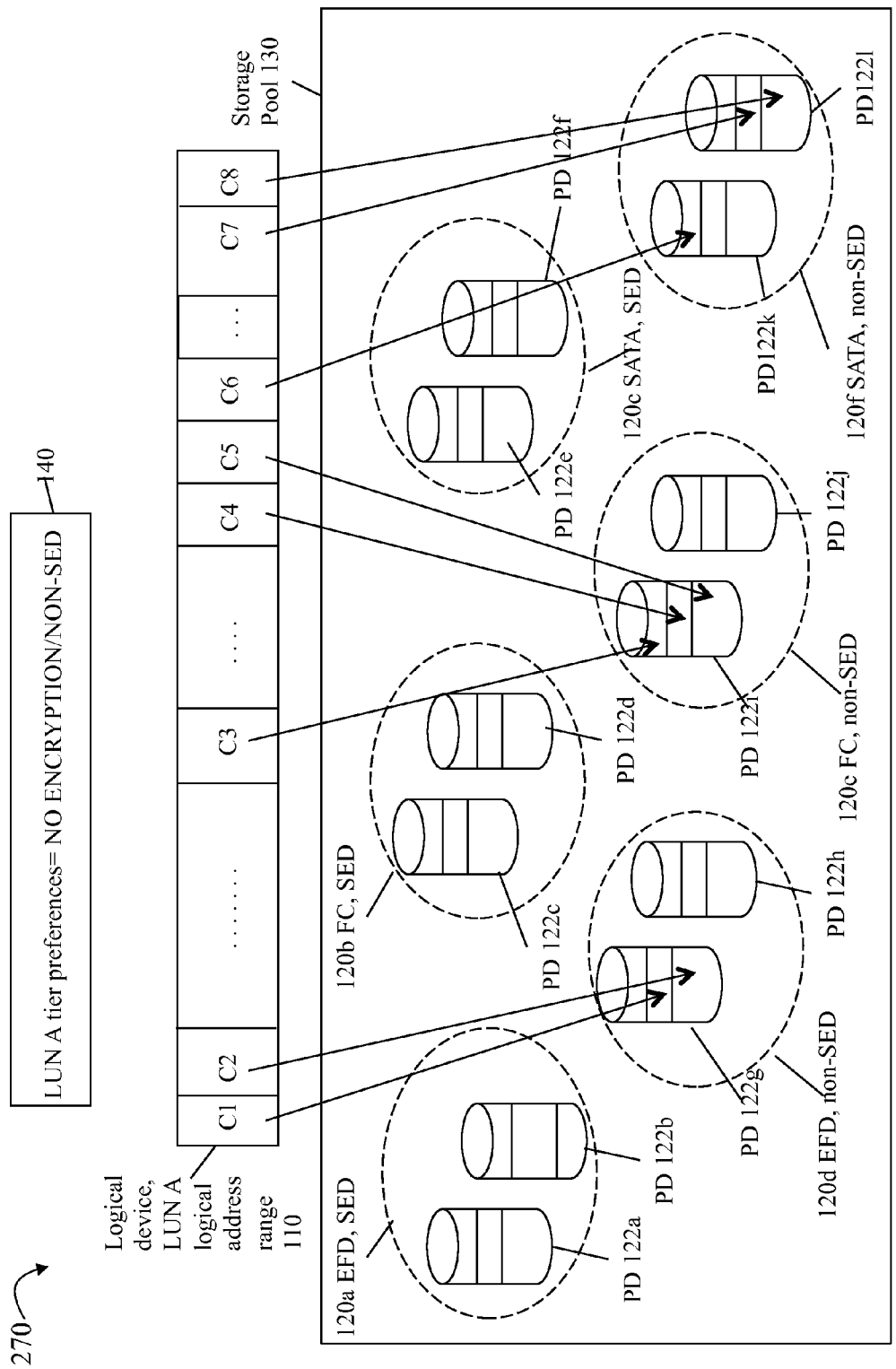

At a later third point in time, assume that data portions of LUN A become desensitized over time whereby it is no longer necessary to store LUN A's data on SED-based tiers. With reference now to FIG. 3C, the tiering preference 140 may be accordingly modified and set as illustrated to denote no encryption/non-SED. In this manner, setting the SED property as a preference may change over time and the data storage optimizer or other data movement module may accordingly relocate the data portions as the SED property setting for the LUN changes. The data storage optimizer may be used in one aspect to migrate data between SED-based storage tiers and non-SED based storage tiers over time based on the updated non-SED/no encryption property preference 140 for the LUN A as illustrated in the example 270 of FIG. 3C.

In response to modifying the tiering preference 140 from encryption/SED to no encryption/non-SED as in FIG. 3C (thereby indicating that data portions of LUN A are not stored in encrypted form and may be stored on non-SED storage tiers 120*d-f*), the data storage optimizer may perform data movements in accordance with the preferences 140 as data movement criteria. For purposes of simplicity in illustration, assume the workload or activity levels of the data portions C1-C8 remain approximately the same as in connection with FIGS. 3B. In this case, responsive to setting the preference to no encryption/non-SED as in FIG. 3C, the data storage optimizer may perform data movement to relocate data portions of LUN A from tiers as illustrated in FIG. 3B to other tiers as illustrated now in FIG. 3C. In particular, the optimizer may move the data portions C1 and C2 from tier 120*a* (as in FIG. 3B) to tier 120*d* (as in FIG. 3C), to move data portions C3-C5 from tier 120*b* (as in FIG. 3B) to tier 120*e* (as in FIG. 3C), and to move data portions C6-C8 from tier 120*c* (as in FIG. 3B) to tier 120*f* (as in FIG. 3C). In a similar manner as described above, the optimizer may perform further data movements of data portions of LUN A between storage tiers 120*d*-120*f* as the activity or workload of the data portions change over time.

At a fourth point in time, the tiering preference may once again be modified from no encryption/non-SED as in FIG. 3C to encryption/SED as described above in connection with FIG. 3B. In response to now further modifying the tiering preference 140 of FIG. 3C from no encryption/non-SED to encryption/SED (thereby indicating that data portions of LUN A are to be stored in encrypted form and may be stored on SED storage tiers 120*a-c*), the data storage optimizer may perform data movements in accordance with the updated preferences as data movement criteria. For purposes of simplicity in illustration, assume the workload or activity levels of the data portions C1-C8 remain approximately the same as in connection with FIG. 3C. In this case responsive to modifying the LUN A tiering preferences from no encryption/non-SED to encryption/SED, the data storage optimizer may perform data movements to return the state from FIG. 3C to that as illustrated in FIG. 3B by moving the data portions C1 and C2 from tier 120*d* to tier 120*a*, moving data portions C3-C5 from tier 120*e* to tier 120*b*, and moving data portions C6-C8 from tier 120*f* to tier 120*c*. In a similar manner as described above, the optimizer may perform further data movements of data portions of LUN A between storage tiers 120*a-c* as the activity or workload of the data portions change over time.

The foregoing illustrates how a non-encrypted LUN may be easily converted to an encrypted LUN, and vice versa (e.g., encrypted LUN converted to a non-encrypted LUN) by modifying the LUN's tiering preference. As the encryption preference changes, the optimizer may accordingly relocate data portions of the LUN to one or more tiers having the specified preference of SED/encryption or non-SED/no encryption depending on the tier preference setting.

In connection with techniques herein, an embodiment may have a LUN status or setting (also referred to herein as the encryption status indicator) denoting whether all the LUN's data is stored in encrypted form. For example, responsive to modifying the tiering preference from no encryption/non-SED to encryption/SED, the optimizer may relocate the data portions of the LUN to any one or more of the SED-based tiers 120*a-c*. Once such relocation or movement of LUN A's data has completed, the LUN's encryption status indicator may be accordingly set to denote that all LUNA's data is now stored on SED-based tiers, or more generally, stored in an encrypted form.

In some embodiments, initially, a data storage system may not have SED drives in the data storage system so that all data portions of all LUNs are stored on non-SED drives, or more generally, not stored in an encrypted form. The pool may not initially include any SED-based storage tiers when a LUN is created from the pool. At a later point in time, SED drives may be added to the data storage system and the configuration of the pool modified to also include one or more additional SED-based storage tiers of the SED drives added. In this case, the system may now include one or more SED-based tiers and also one or more non-SED-based tiers. For existing LUNs which have created prior to adding the SED-based tiers, a tier preference may be specified which indicates whether the LUN's data is to be stored on SED drives. In this case, the data storage optimizer may then migrate or relocate data of each such LUN having an SED tiering preference to an SED tier in a manner such as described above in connection with transitioning from a state of FIG. 3C to a state of FIG. 3B.

As a first generalization to the above description, tiering requirements and/or tiering preferences may be specified for each LUN. Tiering preferences are described above as preferred properties or attributes of a storage tier upon which to locate a LUN's data. In contrast, a tier requirement may denote a requirement rather than a preference whereby the data storage optimizer may be required to abide by the requirement in connection with data movements. For example, specifying a tiering requirement of SED or encryption may require the optimizer to store the associated LUN's data on an SED tier. Responsive to a violation of such requirements, an action may be taken such as, for example, the LUN's data may not be accessible for data operations until such requirement(s) are met. In connection with this first generalization, an attribute or property that may be specified as a tiering preference as described above may also be specified as a tiering requirement. The optimizer may view tiering requirements as having a higher priority than tiering preferences when evaluating different data movement options.

As described above, the tiering preferences and/or requirements may be specified at the per LUN or logical device level. As a second generalization in accordance with techniques herein, the tiering preferences and/or requirements may be specified at different and/or additional levels of granularities besides the per LUN or logical device level as noted above. An embodiment may more generally support different level(s) of granularity at which the tiering preference and/or requirements may be specified. For example, an embodiment may support a finer level of granularity at the sub-LUN level at which the tiering preferences and/or requirements may be specified. More generally, an embodiment may support one or more levels of granularities at which the tiering preference and/or requirement settings may be specified such as at the LUN level and/or the sub-LUN level (e.g. some portion of a LUN). For example, an embodiment may provide support for the tiering preferences and/or requirements at a level of granularity which is the same as the level of granularity used by the data storage optimizer for relocating data among different storage tiers.

In connection with techniques herein, triggers for setting or specifying tiering preferences or requirements may be manually specified such as by a user or may be specified automatically. For example, other software and/or hardware modules may automatically determine that selected data portions of a LUN, or all data of selected LUNs, should be stored on SED drives thereby automatically setting or modifying the SED tiering preference and/or requirement for a LUN or other supported level of granularity.

Referring to FIG. 4, shown is an example illustrating tiering preferences and status information that may be maintained per LUN in an embodiment in accordance with techniques herein supporting a LUN-level of granularity. The example 300 includes a table of LUNs and associated information. The table includes a first column of LUNs 310, a second column of tiering preferences 320, a third column of tiering requirements 330, and a fourth column of encryption status indicators 340. Each row in the table of 300 represents information for a single LUN.

Row 342 includes information for LUN A whereby EFD is indicated as a tiering preference and encryption/SED is indicated as a tiering requirement. Currently column 340 indicates an encryption status of "0" (zero) for LUN A denoting that LUN A's data is not fully encrypted. For example, it may be that the tiering requirement was just modified from no encryption/non-SED to encryption/SED as in FIG. 4 and the data movements to SED-based tiers are in progress, but not yet complete, to relocate LUN A's data portions from non-SED to SED-based tiers. Once such data movement has completed for all of LUN A's data to SED-based tier(s), the encryption status in column 340 may be accordingly updated to "1" (one) denoting that LUN A's data is fully encrypted. In connection with indicating SED as a requirement and EFD as a preference, the optimizer may first locate as many data portions of LUN A as possible in a storage tier meeting both the EFD preference and SED requirement. If there is insufficient storage in one or more such tiers for all LUN A's data, then the optimizer may locate any remaining data portions of LUN A on a storage tier that meets the SED requirement but not the EFD preference (e.g., tiers such as SED-based tiers 120b and 120c of FIG. 3A).

Row 344 includes information for LUN B whereby FC is indicated as a tiering preference and encryption/SED is indicated as a tiering requirement. Currently column 340 indicates an encryption status of 1 for LUN B denoting that LUN B's data is fully encrypted (e.g., all LUN B's data is stored on tiers having the encryption/SED attribute).

Row 346 includes information for LUN C whereby no encryption/non-SED is indicated as a tiering preference and EFD is indicated as a tiering requirement. Currently column 340 indicates an encryption status of 0 for LUN C denoting that LUN C's data is not fully encrypted. In connection with specifying EFD as a requirement and no encryption/non-SED as a preference, LUN C's data is required to be stored on EFD. As an example, consider the case with reference to FIG. 3A as described above having 6 storage tiers including an EFD, SED tier and an EFD, non-SED tier. The EFD non-SED tier may have insufficient available capacity to store all of LUN C's data so that any remaining data portions of LUN C's data may then be stored on the EFD, SED tier. In this manner, the tiering requirement may be characterized as a higher priority than the tiering preference as data movement criteria as may be used by the data storage optimizer or other component performing data movements in accordance with techniques herein.

Row 348 includes information for LUN D whereby EFD is indicated as a tiering requirement and encryption/SED is indicated as a tiering preference with the encryption status of 1 (denoting that all of LUN D's data is currently encrypted and stored in an encrypted/SED-based storage tier). In connection with specifying EFD as a requirement and encryption/SED as a preference, LUN D's data is required to be stored on EFD and preferred, but not required, to be encrypted. As an example, consider the case with reference to FIG. 3A as described above having 6 storage tiers including an EFD, SED tier and an EFD, non-SED tier. In this particular example, the EFD SED tier has sufficient capacity to store LUN D's data. However, as a variation, assume the EFD SED tier has insufficient available capacity to store all of LUN D's data so that any remaining data portions of LUN D's data may then be stored on the EFD, non SED tier. In this manner, the tiering requirement may be characterized as a higher priority than the tiering preference as data movement criteria as may be used by the data storage optimizer or other component performing data movements in accordance with techniques herein.

Setting SED as a tiering requirement may be used to ensure that encrypted data portions of a LUN are not moved to non-SED tiers and are stored in an encrypted form. Setting SED as a tiering preference indicates that it is preferred, although not required, to store data portions of an associated LUN in an encrypted form on an SED tier. With preferences, the optimizer will attempt to meet such preferences in combination with requirements and may give higher priority to data placement options which meet such preferences in combination with requirements over those which only meet requirements but not preferences. In this manner, preferences may be used as a lower level criteria in contrast to tiering requirements having a higher level of criteria used in connection with performing data movements.

As noted above, the information of FIG. 4 maintained at the LUN level of granularity may also be stored for other supported levels of granularity such as at the sub-LUN level. In this manner, an embodiment may provide for finer granularities of control for use in connection with storing data of LUNs.

For example, reference is now made to FIG. 5 showing information that may be used in an embodiment in accordance with techniques herein for a single LUN, LUN A. The information in the example 400 is similar to that as described in connection with FIG. 4 with the difference that FIG. 5 illustrates information for data portions of a single LUN A. It should be noted that similar information may be maintained for other data portions of other LUNs even though only a single LUN A's data portions are illustrated. Rows 442, 444 and 446 of FIG. 5 include information respectively analogous to rows 342, 344 and 346 of FIG. 4 as described above. However, as noted above, the example 400 provides such information for a sub-portion of a LUN rather than on a per-LUN basis (e.g., the tiering preferences and requirements and encryption status indicator are specified for a sub-portion of a LUN and its associated data). In this manner, providing a finer granularity of control for portions of a LUN allow for better use of SED-based and non-SED-based storage tiers in accordance with techniques herein.

An embodiment may provide one or more control mechanisms and associated parameters that may be used to affect the data movement from a non-SED tier to an SED tier. Such controls may be specified, for example, when initially setting the tiering preference or requirement for a LUN to indicate that the LUN's data should be stored on an SED tier. For example, a window of time may be specified within which this encryption is to be completed (when all data associated with the LUN is to be migrated from the non-SED tier to an SED tier). Generally, the smaller the specified window of time, the more aggressive and higher priority given to processing to that performs the foregoing data movement. As another example, an embodiment may allow for specifying a start time or an option to cause the data movement to start immediately. By default, processing to relocate data from the non-SED tier to the SED tier may be performed as a background task.

In an embodiment using SED-based storage tiers as described herein, efficient use of SED drives in a heterogeneous storage pool environment may provide increased flexibility in data storage environments.

Techniques described herein may be used in connection with specifying an option (e.g., tiering preference or requirement) for a LUN indicating whether data of the LUN is encrypted. The option may be specified when a user initially provisions storage for the LUN from a storage pool. Techniques herein also provide capability to change a LUN from a non-encrypted to an encrypted state seamlessly by simply modifying the setting of the option (e.g., modify a LUN's tiering requirement from no encryption/non-SED to encryption/SED). In the storage pool, SED drives may be mixed with other non-SED drives such as by adding a set of SEDs to an existing storage pool of regular non-SED devices. In an embodiment, the storage system may automatically configure such a pool using predefined policies so that SEDs are grouped into an encrypted storage tier, internally constructed using RAID Groups of SEDs. This encrypted storage tier included in a storage pool may provide encrypted data portions that can be allocated for LUNs of the pool. When the storage system creates a pool LUN with the SED/encryption tiering requirement, storage is allocated for data portions of the pool LUN only from the encryption tier(s) to fulfill the capacity allocation for the encrypted pool LUN. At the same time, the data storage optimizer may be used in an embodiment and recognize that these encrypted data portions having the SED/encryption tiering requirement set are different from those data portions allocated from non-SED drives. The data storage optimizer may not relocate these encrypted slices stored on SED-based tiers with a tiering requirement to other non-SED tiers (e.g., when SED/encryption is specified as a tiering requirement, relocation of such data portions may occur only between SED-based tiers). Based on this design, a non-encrypted LUN can easily be converted to an encrypted LUN by changing its tiering preference and/or requirement to encrypted/SED-based storage tier. Once the encryption preference or requirement is set, the data storage optimizer (or more generally data movement module) commences relocation of all non-encrypted slices to storage of an encrypted/SED-based tier. After the movement or relocation has completed, the LUN's encryption status indicator may be set or marked denoting the LUN's data as being fully encrypted.

Data movements may be performed by a data storage optimizer, or more generally, a data movement or relocation module, based on one or more data movement criteria. Such data movement criteria may include storage tiering preferences and/or requirements and also workload or activity of data portions.

Figure 6:
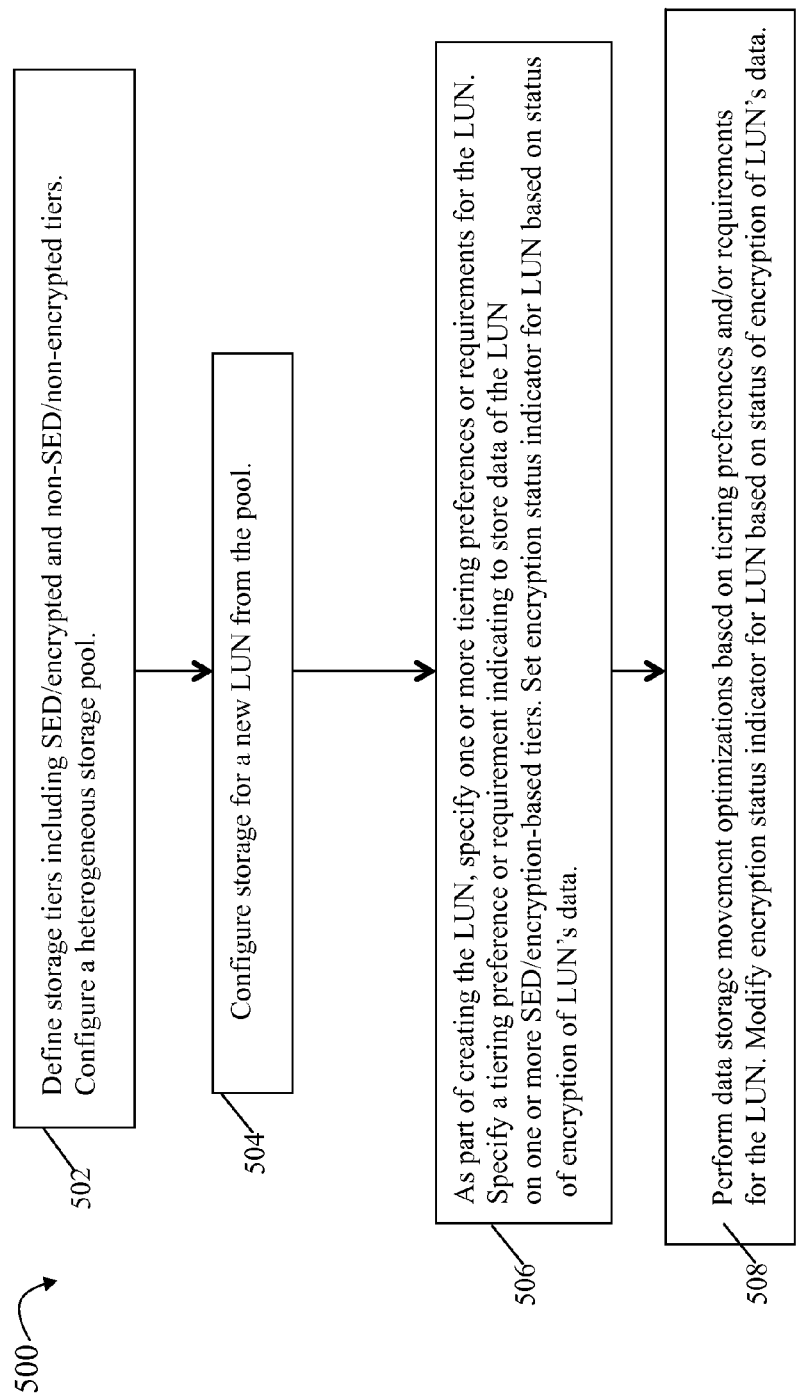
FIGS. 6, 7 and 14 are flowcharts of processing steps that may be performed in an embodiment in accordance with techniques herein.
Figure 7:
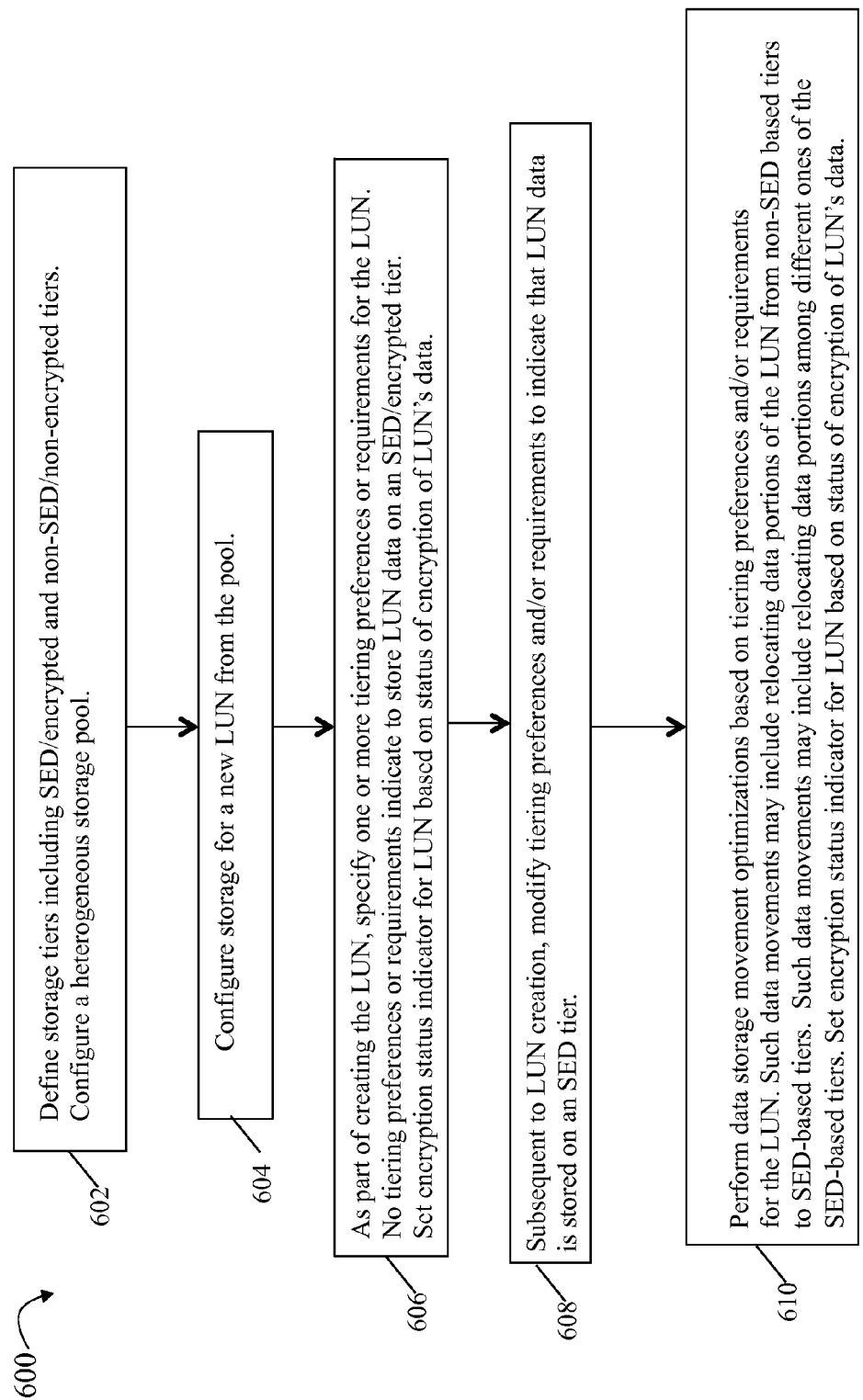

What will now be described are flowcharts in FIGS. 6 and 7 which summarize processing described above for use in connection with techniques herein having LUN-level granularity for tiering preferences and requirements. However, as will be appreciated by those skilled in the art and as noted above, such techniques and processing may be used in connection with other levels of granularity besides per-LUN. Also, processing in connection with FIGS. 6 and 7 are described with respect to a single LUN but may also be performed for multiple LUNs all having storage allocated from the same heterogeneous storage pool. In connection with a storage pool having storage allocated for multiple LUNs, the data storage optimizer may perform processing such as described herein for the combination of all data portions across all LUNs having storage allocated from the pool.

Referring to FIG. 6, shown is a first flowchart of processing steps that may be performed in an embodiment in accordance with techniques herein. The flowchart 500 summarizes processing as may be performed using techniques herein in connection with provisioning storage for a LUN. At step 502, one or more storage tiers may be defined which include SED/encrypted tiers and also non-SED/non-encrypted tiers. A storage pool may be configured which includes both SED/encrypted and non-SED/non-encrypted tiers. At step 504, a new LUN is configured from the pool. At step 506 as part of creating the LUN, one or more tiering preferences and/or requirements may be specified for the LUN. A tiering preference or requirement may be specified indicating to store data of the LUN on one or more encrypted/SED-based tiers. An encryption status indicator for the LUN is set based on the status of encryption of the LUN's data (e.g., whether all the LUN's data is stored in an encrypted form thereby having a status of 1, or otherwise thereby having an associated status of 0). At step 508, data storage movement optimizations may be performed based on tiering preferences and/or requirements of the LUN. For example, if a tiering requirement of encryption/SED is specified for the LUN, the data storage optimizer may perform data movement optimizations to relocate data portions of the LUN among different ones of the SED-based storage tiers of the pool based on the relative activity or workload of the data portions of the LUN. Step 508 may include modifying the encryption status indicator for the LUN over time in accordance with whether all the LUN's data is stored in an encrypted form at different points in time.

Referring to FIG. 7, shown is a second flowchart of processing steps that may be performed in an embodiment in accordance with techniques herein. The flowchart 600 summarizes processing as may be performed using techniques herein in connection with provisioning storage for LUN and then subsequently modifying tiering preferences and/or requirements. At step 602, one or more storage tiers may be defined which include SED/encrypted tiers and also non-SED/non-encrypted tiers. A storage pool may be configured which includes both SED/encrypted and non-SED/non-encrypted tiers. At step 604, a new LUN is configured from the pool. At step 606, as part of creating the LUN, one or more tiering preferences and/or requirements may be specified for the LUN. In this example, no tiering preferences or requirements may be initially specified which indicate to store LUN data on an SED/encrypted tier. The LUN's encryption status indicator may be accordingly set to indicate that all the data of the LUN is not stored in an encrypted form. At step 608, subsequent to LUN creation at a later point in time, a tiering preference and/or requirement may be modified to indicate that LUN data is stored on an SED-based tier (e.g., stored in an encrypted form). In step 610, the data storage movement optimizer may perform data movement optimizations based on tiering preferences and/or requirements for the LUN. Such data movements may include relocating data portions of the LUN from non-SED-based tiers to SED-based tiers. Such data movements may also include relocating data portions among different ones of the SED-based tiers in accordance with the varying activity levels of the data portions at different points in time. It should be noted that an embodiment may perform such data movements as a background process to minimize any adverse impact on active I/Os to the LUNs. Step 608 may include modifying the LUN's encryption status indicator at various point in time depending on whether all data portions of the LUN are stored in an encrypted/SED-based tier or not based on the data movements performed.

What will now be described are techniques that may be used in connection with providing hints to the data storage system identifying what data portions, such as at a sub-LUN level, should have their data stored in physical devices in an encrypted form (e.g., in an SED-based tier) or not stored in an encrypted form (e.g. in a non-SED storage tier). Such hint information may include a tiering preference and/or tiering requirement indicating whether one or more particular data portions of a LUN are to be stored on physical device in an encrypted form. For purposes of illustration, reference may be made in following examples to using hints with a tiering requirement indicating that it is required that one or more designated data portions of a LUN have their data stored in an encrypted form and thus on a physical device of an SED-based tier. However, such techniques may be used with hint information including tiering preference and/or tiering requirement information indicating whether one or more particular data portions of a LUN are to be stored on physical devices of a data storage system in an encrypted form. Such hint information may be stored in the form of LUN metadata on the data storage system as described above. In accordance with techniques herein, an application on a host having its data stored on a data storage system may communicate such hint information to the data storage system indicating whether to selectively store particular portions of the application's data in an encrypted form (e.g. on a physical device of an SED-based tier).

As known in the art, there are different protocols that the host may use to communicate with the data storage system, such as FC, SCSI, iSCSI, and the like. The host may issue different commands to the data storage system such as, for example, data operations or I/O commands to read and write data, various control and informational commands (e.g., non-I/O commands such as to query and return information), and the like. Some embodiments using techniques herein may communicate information to the data storage system in the form of hints or I/O tagging by adding additional context information to a command such as an I/O request or command (e.g., write request). In this manner, a user of an application on the host may choose to encrypt or not encrypt certain files, portions of files, or more generally, any object corresponding to a logical portion of data. On the host side, the application may communicate such information to a file system of the host used in storing the file data and the file system may then identify which particular blocks of one or more LUNs correspond to the file identified as required to be stored in an encrypted form on a physical device of an SED-based tier. The host may communicate hint information to the data storage system identifying the particular LUN(s) and blocks thereof having to be stored in an encrypted form. The hint information may be included as additional information in connection with a command, such as an I/O request or other command, sent from the host to the data storage system. The data storage system may then extract the encryption hint information from the received command and store such hint information as LUN metadata identifying the different data portions of the LUN to be stored in an encrypted form (e.g., in an SED-based tier) or not stored in an encrypted form (e.g., in a non SED-based tier) as described above (e.g., FIG. 5).

As described in more detail below, the hint information may be included as additional information in an I/O command, such as a write command, which performs an operation with respect to a particular referenced location (e.g., LUN and one or more LBAs of the LUN) identified in the command. The hint information may be included in the command and may be characterized as implicitly tagging the data portions referenced in the command so that the hint information applies in scope to only the location of the I/O operation. For example, if the command is a request to write data at a target location identified in the command as a particular LUN and LBA range, the hint information need only specify an option or setting to store data in an encrypted form or not in an encrypted form and the hint information is implicitly understood as applying only to the target location of the data operation. Hint information may also be included in other commands which are not I/O commands and may not modify any data. For example, hint information may be included in a command which is used to set and/or modify hint information that may be stored on the data storage system as LUN metadata for the different data portions of the LUN.

Some existing and draft standards may provide for communicating hint information such as related to providing information related to data access patterns (e.g., whether I/O pattern is mostly sequential reads, most random reads). An example of such a draft standard is a draft SCSI-based standard by INCITS Technical Committee T10, document number 11-436R6 (revision 6) dated May 5, 2012, entitled SBC-3: LBA Access Hints, at www.t10.org. An embodiment in accordance with techniques herein may further extend use of hint information to provide yet additional types of hint information regarding what data portions should be stored in an encrypted form or not stored in encrypted form on the data storage system. However, it should be noted that techniques described herein are not limited to those such as included in the draft standard. Techniques herein may generally use any command and any protocol. Such commands may be vendor defined commands, I/O commands, or other types of commands as may be supported in an embodiment.

It should be noted that depending on the embodiment, encryption hint information may be included alone, or possibly in combination with other types of hint information that may be supported in accordance with particulars that may vary with each embodiment. For example, as just noted, a standard may include support for different types of hint information to be communicated between the host and data storage system in one or more particular commands whereby such hint information may include encryption hint information alone, or possibly in combination with other types of hint information such as I/O access pattern information. Such I/O access pattern information may be used in connection with determining other attributes of a storage tier that may be desirable for storing particular data portions.

An embodiment of the techniques herein may use a finer or lower level of granularity at the sub-LUN level denoting the smallest storage unit for which individual hint information may be specified. Such level of granularity may be less than the file level. In one embodiment, for example, the level of granularity may be at the slice level where a slice may be, for example, 256 megabytes. In this case, hint information may be specified at the slice level where hint information may be communicated identifying individual slices which should have data stored in an encrypted form or not stored in an encrypted form. Other embodiments may use different levels of granularity such as at the block level (e.g., where a block may be for example 512 bytes), or, more generally any other suitable atomic unit representing some number of blocks. In some embodiments, hint information may be specified for individual data portions which are of a particular size selected in accordance with an atomic unit associated with one or more other data services or operations. For example, physical storage may be allocated or provisioned from physical devices in data portions at the slice level and/or automated tiering or data movement between tiers may be performed at the slice level. In this case, an embodiment may accordingly select a level of granularity as the smallest atomic unit for which an encryption/decryption hint may be provided to match the level of granularity as noted for allocation and/or automated data movement, such as at the slice level. Although any suitable level of granularity may be specified as the smallest unit for which hint information may identify as being stored in an encrypted form in hint information, following examples may use a size unit equal to one block or addressable LUN or file offset unit, or a predetermined number of such units. For example, a single unit within a logical address range of a LUN (which may also refer to the smallest address unit of an offset within a file). It should be noted that an embodiment may also provide support for specifying hint information at the sub-LUN level alone or in combination with specifying hint information at the LUN level although following description and examples refer generally to data portions at a sub-LUN level.

As a first example, what will now be described is I/O tagging in which hint information may be included in a header of a write command whereby the hint information applies to all data denoted by the write command target location to which data is being written or modified. In connection with this first example, hint information may be used to individually "tag" hint information to a write command's data. When data is sent from the host to the data storage system, the write command indicates to encrypt or not encrypt the data portion(s) or target location of the write command. For example, the write command may indicate to store data of the write command to a target location in an encrypted form and thus on a storage device of an SED-based tier. The data storage system may then use this hint information to accordingly store the data of the write command on a storage tier storing the data in encrypted form. In one embodiment as described in more detail below, the header of the command (such as the write command) may include one or more flags or bit settings comprising the hint information whereby such settings denote to encrypt or not encrypt the data of the write command. Implicitly, the hint may apply to all data of the write command. For example, if the write command writes data to LUN A at LBA1-100, the encryption hint implicitly applies to all write data (e.g., the entire target range of the write command) whereby the data storage system may also record the hint information as metadata to encrypt all data stored at LUN A, LBA1-100.

Figure 8:
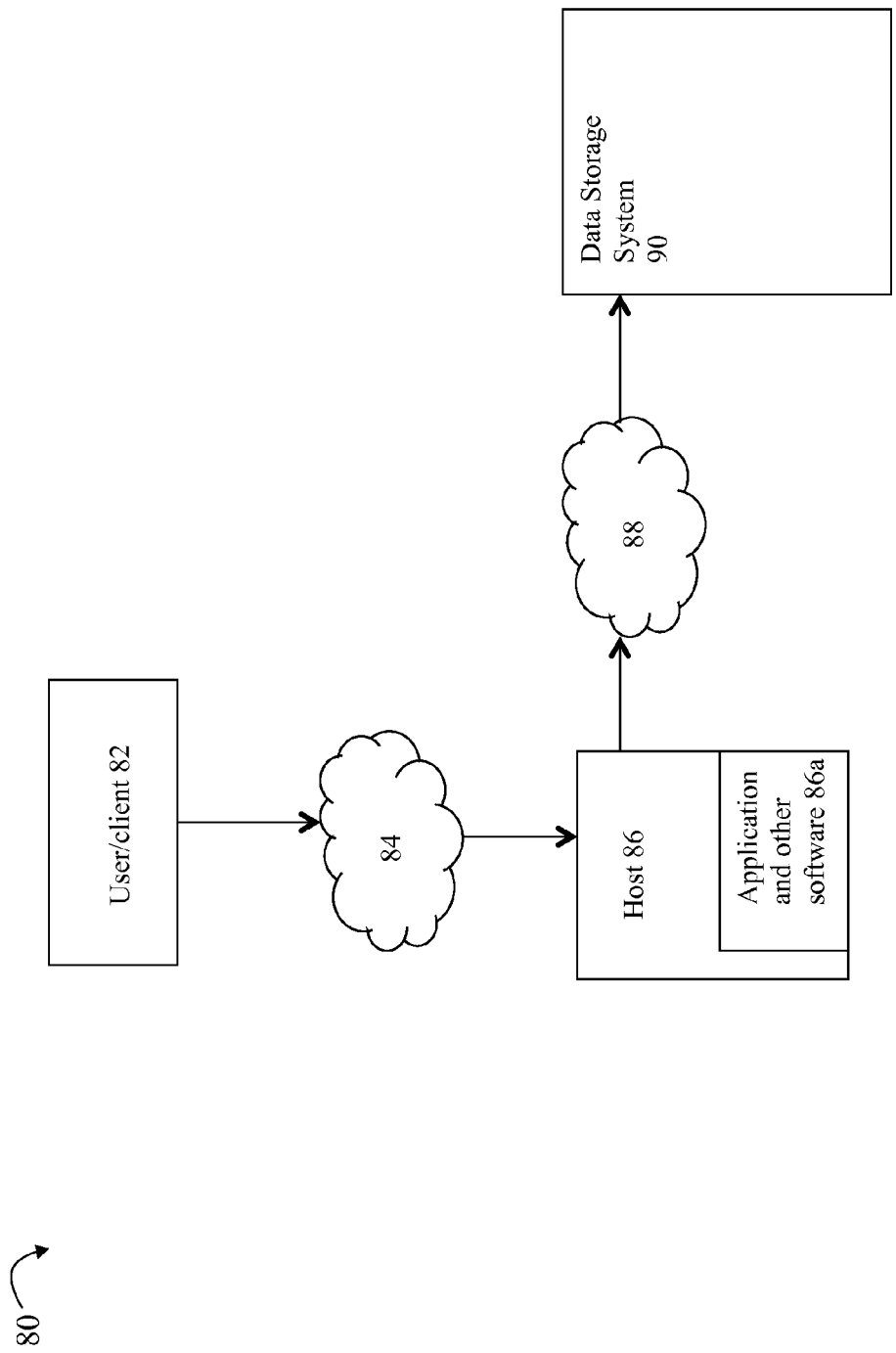

With reference to FIG. 8, the data storage system 90 may store data on physical devices thereof consistent with description elsewhere herein for an application executing on host 86. A user or client 82 may issue a request to the application running on the host 86. The request may be issued by the user/client 82 over network 84 and is received by the host 86. The host 86 may include the application and also other software 86. The request from user/client 82 to the application may be processed on the host 86 and result in the host 86 issuing a request to the data storage system 90 to perform a data operation such as to write data for the application to the data storage system 90. In one example described below, the application may perform operations on files, such to write data to a file, as requested by the user/client 82.

Figure 9:
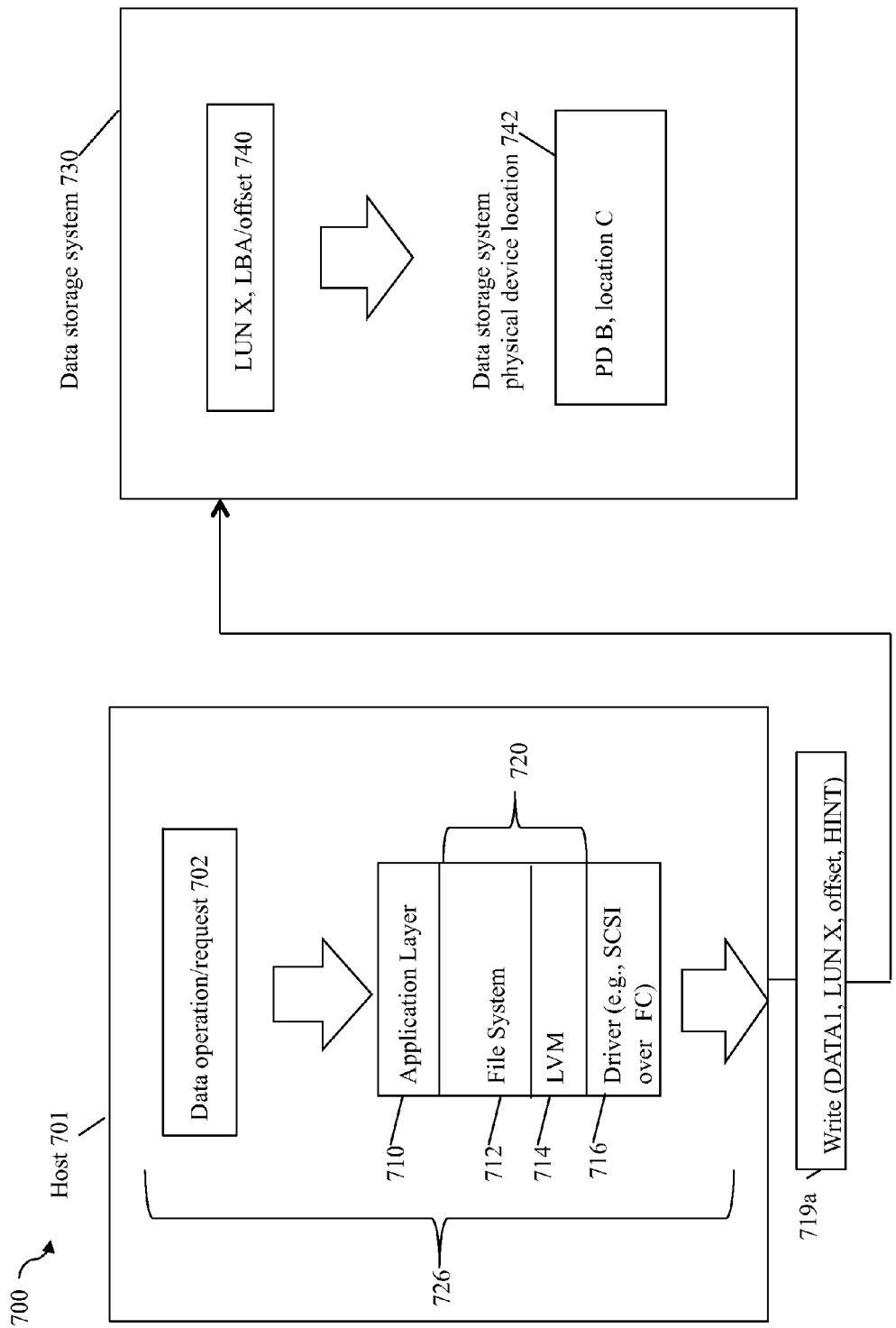
FIG. 9 is an example illustrating in more detail processing and data flow of a host and data storage system in an embodiment in accordance with techniques herein.

With reference to FIG. 9, shown is an example 700 of processing as may be performed in connection with a data request 702 such as in connection with processing a write data request 702 utilizing techniques herein. The request 702 to perform the data operation may be received by the host. The request 702 may include information identifying what data portions of the application's data are to be stored/not stored in an encrypted form, for example if the user identifies the particular data portions to be encrypted/not encrypted. Alternatively, the particular data portions to be stored/not stored in an encrypted form may be identified by a level of the I/O stack 726 described below, such as by the application layer 710 and/or file system 712. For example, it may be that the application layer and/or file layer determines by default which files, or portions thereof, are to be stored in encrypted form or not stored in an encrypted form.

Elements 710, 712, 714 and 716 illustrate exemplary software layers that may be executed at runtime on the host 86 as part of a runtime stack or I/O path 726 in an embodiment not in accordance with techniques herein to process the request 702 received from the user/client 82 (of FIG. 2C). Application layer 710 may represent the application receiving the request 702 from the user/client 82. The application (as represented by the application layer 710) may communicate with the next lower layer in the stack which may be the file system 712. In this manner, the application layer 710 may translate or map request 702 to a call to the file system layer 712 in accordance with a file system reference using file system-based semantics (e.g., where data operations may be expressed in terms of a reference to a "file" and an offset or location in the file). The file system layer 712 may communicate with the LVM or logical volume manager 714. The data operation may be expressed for use by different layers (e.g. application and file system layers) of the stack 726 in terms of a file system reference which is then mapped by one or more lower layers in the stack 726 to another form referred to as the logical volume or LUN reference. For example, a data operation request (such as to read or write data) may be communicated to layers 710 and 712 using a file system reference (e.g., file identifier such as File 1 and file offset or location in File 1) which is the mapped to a corresponding logical volume or LUN reference (e.g., LV, offset, or LUN, offset). A current form of the I/O request such as in terms of a LUN and offset or logical block address (LBA) may be expressed in terms of a block-based protocol and associated semantics whereby such form is now processed by a driver 116 in accordance with the particular storage and network protocols. For example, the driver 116 may form the appropriate messages such as 719a for issuing the I/O request in accordance with a block-based protocol such as SCSI over FC. In this example, the host may now issue the I/O request as a block-based storage request 119a to the data storage system. The request 719a may perform a write operation where the request includes input parameters expressed in terms of a block-based storage protocol including the data "DATA1" to be written to a target location identified by "LUN X", an "offset" or offset range (e.g., LBA range) within the LUN X, and a HINT identifying whether to encrypt or not encrypt data portions of the LUN X identified by the write operation. The HINT of 719a may correspond to any of the hint information (e.g., preference and/or requirement information regarding whether to encrypt data stored at the write target location LUN X, offset within LUN X) as described herein. In this example, the application may have its file data stored on one or more LUNs of the data storage system and may be accessed at the data storage system using block-based data operations via the foregoing processing performed on the host. In a similar manner, any data returned from the host may be processed in a reverse order up the call stack illustrated by 726. The particular layers included in a host which are processed may vary from that which is described in 726 for illustration. It should be noted that the host-side processing of 726 may include one or more host-side logical device mapping layers. For example, the host may perform processing to map a host-side LV, or other host-side logical device, to one or more LUNs used in connection with providing a block-based request 119a to the storage system.

As illustrated, the write operation request 719a is formed and sent from the host 701 to the data storage system 730. The data storage system 730 performs processing to map or translate the target location 740 (e.g., LUN and LBA or LBA range) of the received data operation request expressed in terms of block-based request into a data storage system physical device location 742. Element 742 illustrates a physical device location on the data storage system including a physical device (PD, such as PD B in 742) and a location on that PD (e.g., such as denoted by location C in 742). The data storage system may also store the HINT information of the received request 719a as metadata for the identified LUN and data portions of the LUN.

Figure 10:
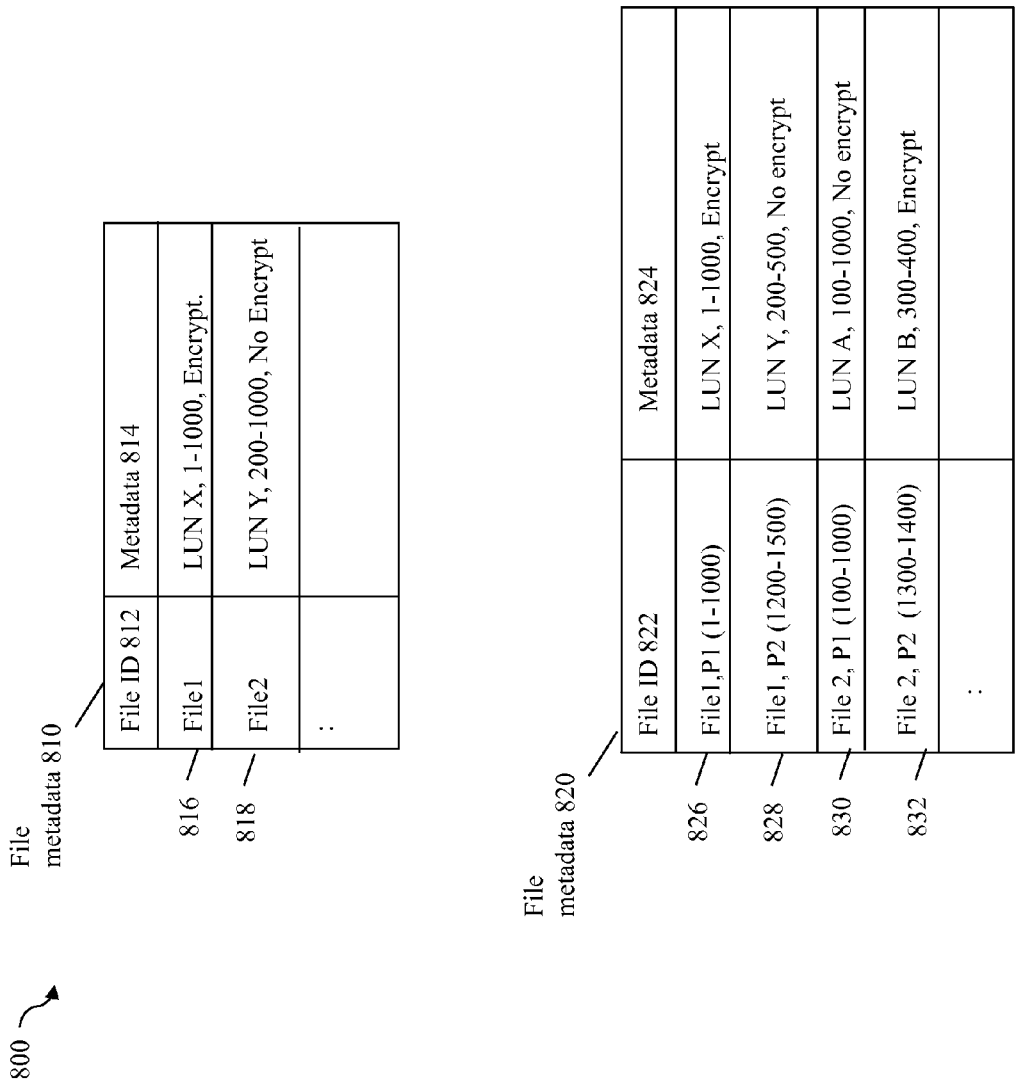
FIG. 10 is an example of file metadata as may be included on a host in an embodiment in accordance with techniques herein.

Referring to FIG. 10, shown is an example 800 of file metadata as may be stored on the host, such as by the file system, for use with techniques herein. The file metadata 810 is an example of metadata that may be stored for each file such as on the host 701 of FIG. 9. In some embodiments, encryption may be specified as a file-level property applicable to all data of the file object in a manner similar to the way other file attributes may be specified for a file. As mentioned elsewhere herein, the encryption file attribute as well as possibly other file attributes may be specified in the request input (e.g. user-specified) to the application layer, may be set by the application layer or application itself (e.g. the application knows that certain files, or all files, are to be encrypted), or may be set by the file system layer (e.g., perhaps based on one or more other attributes or other items of information conveyed to the file system layer from an upper layer), and the like. Exemplary file metadata 810 includes column 812 identifying the particular file (such as with a file identifier (ID)) and column 814 with the associated metadata for the particular file identified in 812. Each row of 810 includes metadata for a different file. For example, row 816 indicates that file 1 is stored on LUN X at LBAs 1-1000 and that data for file 1 is to be encrypted. Row 818 indicates that file 2 is stored on LUN Y at LBAs 200-1000 and that data for file 2 is not required to be encrypted.

In connection with the example 810, although the data storage system may provide for specifying encryption at a particular level of granularity, the host software may provide support for specifying encryption property at the file-level. Alternatively, an embodiment may allow for one or more individual data portions of a file to be encrypted, such as for each individual file offset unit which may be the same size as a single block of basic unit of a LUN, or for a number of such units. File metadata 820 is an example of file metadata that may be used maintained on the host in an embodiment which provides support for allowing individual portions of a file to be encrypted or not encrypted on the data storage system. Table 820 is similar to that as described above in table 810 with the difference that column 822 identifies portions of a file and column 824 identifies metadata corresponding to the file portion identified in column 822. Each row of 820 includes metadata for a different portion of a file. For example, row 826 indicates that file 1, portion P1 (which may correspond to a file offset range such as 1-1000) is stored on LUN X at LBAs 1-1000 and that such data is to be encrypted. Row 828 indicates that file 1, portion P2 (which may correspond to a file offset range such as 1200-1700) is stored on LUN Y at LBAs 200-500 and that such data is not to be encrypted. Row 830 indicates that file 2, portion P1 (which may correspond to a file offset range such as 100-1000) is stored on LUN A at LBAs 100-1000 and that such data is not to be encrypted. Row 832 indicates that file 2, portion P2 (which may correspond to a file offset range such as 1300-1400) is stored on LUN B at LBAs 300-400 and that such data is to be encrypted.

Figure 11:
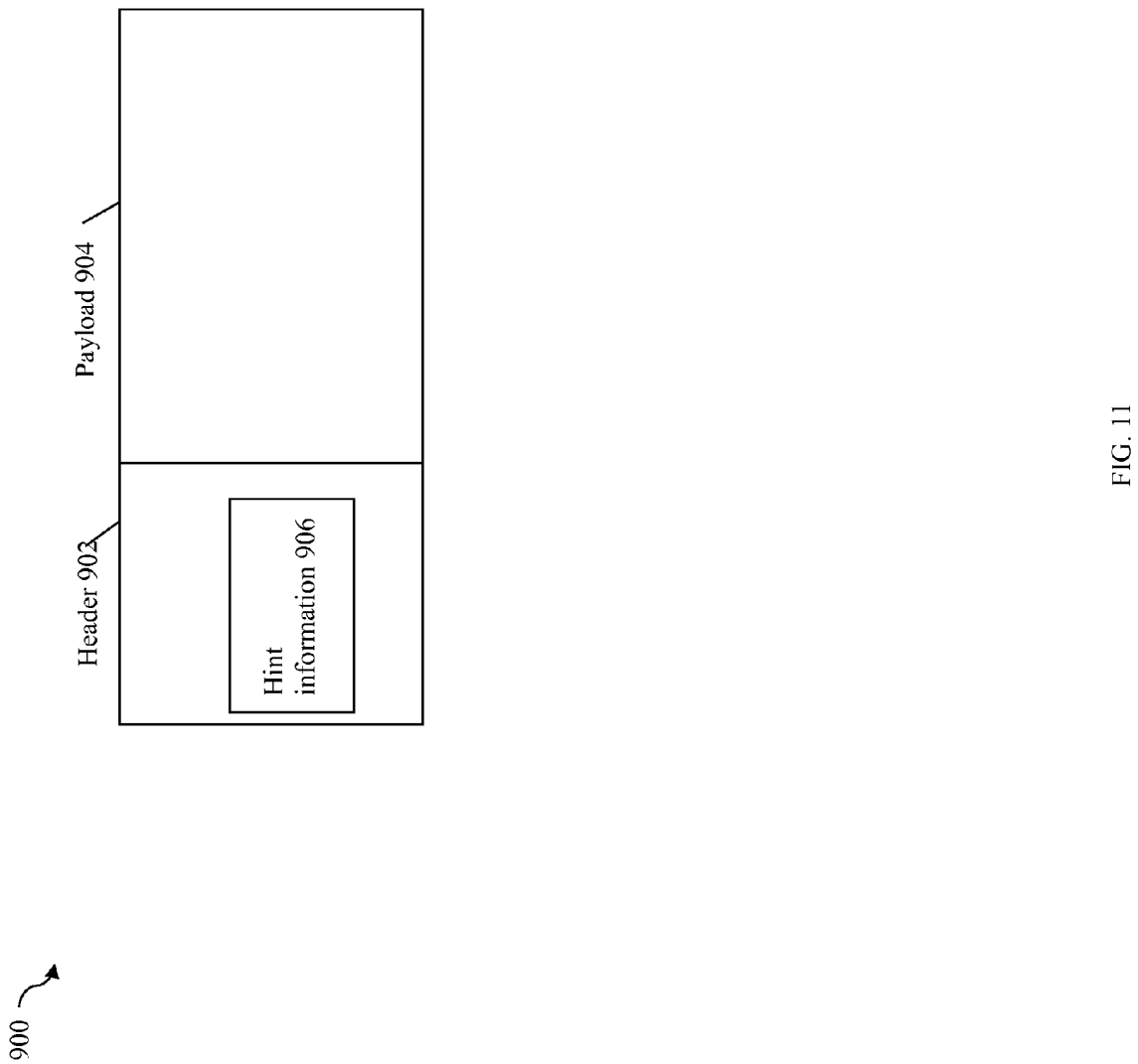
FIG. 11 is an example of a command including hint information that may be used in an embodiment in accordance with techniques herein.

Referring to FIG. 11, shown is an example of a command request such as may be sent from the host to the data storage system in an embodiment in accordance with techniques herein. The command 719a of FIG. 9 may be in accordance with the example 900 of FIG. 11. The command 900, such as a write command, may include header portion 902 and a payload or data portion 904. For a write command, the header 902 may include, for example, an operation code identifying the command type as write (as opposed to read or other possible operations), and other data depending on the command and standard or protocol utilized. Additionally, the header 902 may include hint information 906. As described herein, in one embodiment the hint information may include a descriptor or structure of information for one or more hints (e.g. may be bit or flag settings). The hint information 906 may provide an encryption hint alone or possibly in combination with other types of hint information (e.g., related to I/O access patterns, whether to use compression, data de-duplication, and the like) that may be supported in an embodiment. In connection with the example described with FIG. 9 such as for a write command, the hint information may implicitly apply to the target location of the command, such as the target location (e.g., LUN and associated LBA range of the LUN) to which data of the write operation is written.

More generally, for any command, hint information may be included in the command and the hint information may generally apply to a hint target location (e.g., LUN and associated LBA range) and whether to encrypt/not encrypt any data stored to this hint target location. In this manner, the data portions affected by the hint, or to which the hint is applied, may be inferred implicitly by the target location of the write command. For example, a write command may be to write data to LUN A, LBA offsets 1-100 whereby the write target location is LUN A, 1-100. The hint information of the write command using tagging may include hint information such as setting an appropriate hint bit or flag indicating to store data in an encrypted form on the data storage system whereby the hint target location or particular data portions which are to be stored in encrypted form are identified by the write target location, LUN A, 1-100.

As an alternative, the hint information itself may identify a hint target to which the encryption hint is applicable. In this case, the hint target location may be independent of the write target location even though the write command may be used as the particular command to communicate this hint information to the data storage system. For example, the write command may be to write data to LUN B at offset or LBAs 10-20 and the encryption hint information included in the header of the write command may indicate to encrypt data stored at LUN A, LBA range 1000-2000. In this manner, the write command may be generally described as the means by which the encryption hint may be specified for any hint target location.

Figure 12:
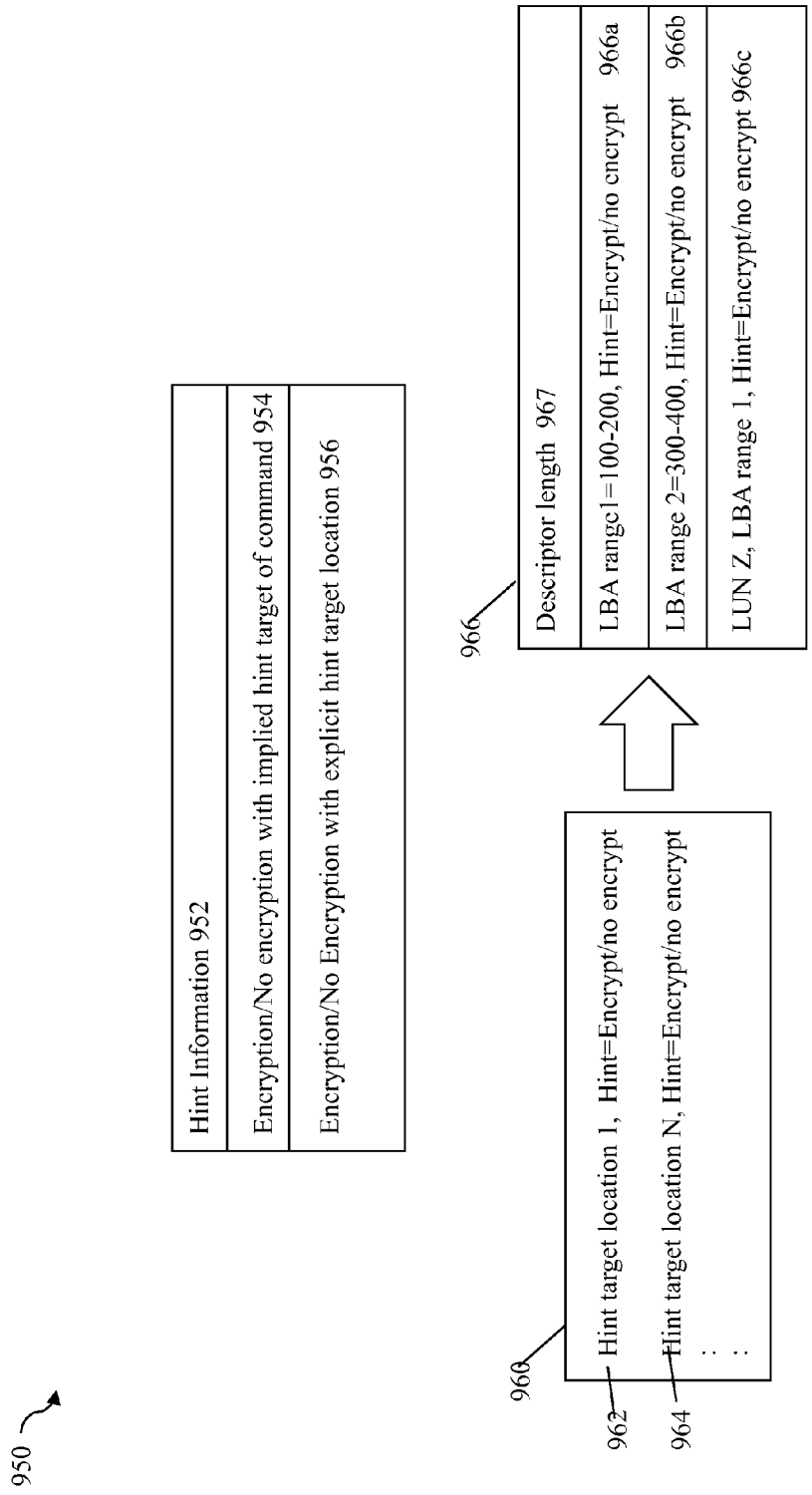
FIG. 12 is an example illustrating hint information variations that may be used in an embodiment in accordance with techniques herein.

Referring to FIG. 12, shown is an example further illustrating hint information as may be included in a command from the host to the data storage system in an embodiment in accordance with techniques herein. The example 950 includes hint information 952. Element 954 indicates a first example of hint information that may be included using a command, such as the write I/O command, where the hint information specifies encryption or no encryption and the hint target location may be implied to be the same target location specified for the command. If the command is writing to target location LUN A, LBA 1-100, then the hint target location to which the hint of encrypt or not to encrypt applies is also the same write operation target location of LUN A, LBA 1-100. Element 956 indicates a second example of hint information that may be included using a command, such as the write I/O command, where the hint information specifies encryption or no encryption and the hint target location may be explicitly specified in the additional information included in the command. For example, the command may be writing to target location LUN A, LBA 1-100, and the hint information may explicitly specify a different target location, such as LUN A, LBA 200-3000, to which the hint of encrypt or not to encrypt applies is applied.

As a further generalization, element 960 illustrates that the command may include hint information for one or more hint target locations. For example, a single write command writing data to LUN A, LBA 1-100 may include a first set of hint information 962 identifying a first hint target location 1, such as LUN A, LBA 1-500, and a hint of whether to encrypt/not encrypt such data, a second set of hint information 964 identifying a second hint target location 2, such as LUN A, LBA 600-700, and a hint of whether to encrypt/not encrypt such data, and so on for possibly additional sets of hint information. Thus, in some embodiments, the hint information in total may be of varying length.

Element 966 indicates one example of information that may be included in a hint information structure such as included as additional optional information in a command header, such as the write command. As first field, the hint information structure may include a descriptor length 967 denoting the total length or size (e.g. number of bytes) of the hint information structure 966. Fields 966a-c each illustrate an additional set of information that may be included in the structure identifying an encryption hint applicable to a different hint target location. Fields 966a-b each respectively specify an encryption hint for data portions of LBA range 1 and LBA range 2. It should be noted that the encryption hint information exemplified by 966a-b may implicitly use the same LUN as the write command in combination with the explicitly specified LBA ranges 1 and 2. For example, the write command may write data to LUN A, 10-20 and the hint information may include a first set of hint information 966a identifying to encrypt LBA range 100-200 and a second set of hint information 966b identifying the encrypt LBA range 300-400 whereby the LUN A is implicit from the write command operation. In contrast, field 966c is an example of hint information that may be included in a write command where the hint target location may explicitly identify a LUN rather than use the implied LUN of the write command. Field 966c may identify to encrypt/not encrypt data portions of LUN Z, LBA range 1 even though the write command may write data to LUN A as described above.

In this manner, the hint information may generally include explicit or implied hint target locations and the hint information of a single command may include one or more sets of such hint information whereby each set may identify a different hint target location and associate encryption hint information denoting whether or not to store data at the hint target location in an encrypted form.

As a further generalization, the command may also generally be any command and does not have to be a write command. The command may be any I/O command or other command whereby the encryption hint information may be included. For example, the command may be a vendor-specific or vendor defined command. Additionally, the command including the hint information does not have to modify or otherwise perform I/O. For example, the hint information specifying a hint target location (e.g., for a portion of a LUN) may be communicated prior to writing any data to the hint's target location, after writing data to the hint's target location and/or also included in the same command which writes data to the hint's target location.

To further illustrate and with reference back to FIGS. 8 and 9, an application on the host may communicate to the data storage system what data portions of particular files are to be encrypted, for example, when a file is created or provisioned prior to writing data to the file. An embodiment may communicate hint information identifying what logical data entities, such as files, and portions thereof should have their data stored in encrypted form on the data storage system. Such hint information may be communicated prior to writing data to such logical data entities. For example, an application may communicate to lower levels in the I/O stack, such as the file system, what files, or portions thereof, should have data stored in encrypted form on the data storage system. The application may indicate, for example, to encrypt data for File A at file offset or locations 1-100, File B at file offset or address locations 50-100 and File C at file offsets or locations 1-100. The file system may store such hint information as part of per file metadata and/or file system metadata. As described above using the file metadata, processing may be further performed on the host where the file id and file offsets may be mapped or translated to corresponding LUN and LUN offsets/LBAs. The host may form the command sent to the data storage system where the command comprises hint information identifying the appropriate hint target locations (e.g., LUN and LUN offsets) and whether the data of said hint target locations is encrypted when stored on physical storage of the data storage system. The data storage system may then extract the encryption hint information from the received command and store the encryption hint information as LUN portion metadata for the applicable data portions.

Subsequent write commands may then write data to Files A, B and/or C at these locations whereby such data is stored on physical devices having the encryption attribute set or on. Such write commands may not include any hint information. At a later point in time, the particular requirements for encryption may change for any of the Files A, B and/or C. For example, assume that File A no longer has to be encrypted. In this case, the application may send a command to the file system indicating that File A no longer has to be encrypted. The file system may update the host-side file metadata for File A to indicate no encryption is required. The host may further determine, using host-side File A meta data, the corresponding LUN(s) and LBA range(s) at which File A is stored. For example, assume that File A has its data storage at LUN X, LBA range 1-100. The host may then send another command (which may not be an I/O command) to the data storage system with an encryption hint indicating that LUN X, LBA range 1-100 may now be stored in decrypted form. The data storage system may then extract the encryption hint information from the received command and store the encryption hint information as metadata for the applicable data portions for LUN X LBA range 1-100. Subsequently, the data movement module, such as the data storage optimizer, may relocate data portions stored at LUN X LBA range 1-100 currently residing on PDs of a first storage tier having encryption/SED to other PDs of one or more other storage tiers having no encryption/non-SED-based tiers.

In this manner, the techniques herein may be used to initially specify and provide a first set of encryption hint information that is subsequently modified or updated with a second set of encryption hint information. Furthermore, the hint information may be included in commands other than I/O commands such as non-I/O commands which set or modify hint information stored and used by the data storage system. An embodiment may also include commands, such as non-I/O commands, which read or retrieve hint information for one or more LUNs and associated LBA ranges. The foregoing is described in more detail in following paragraphs.

Figure 13:
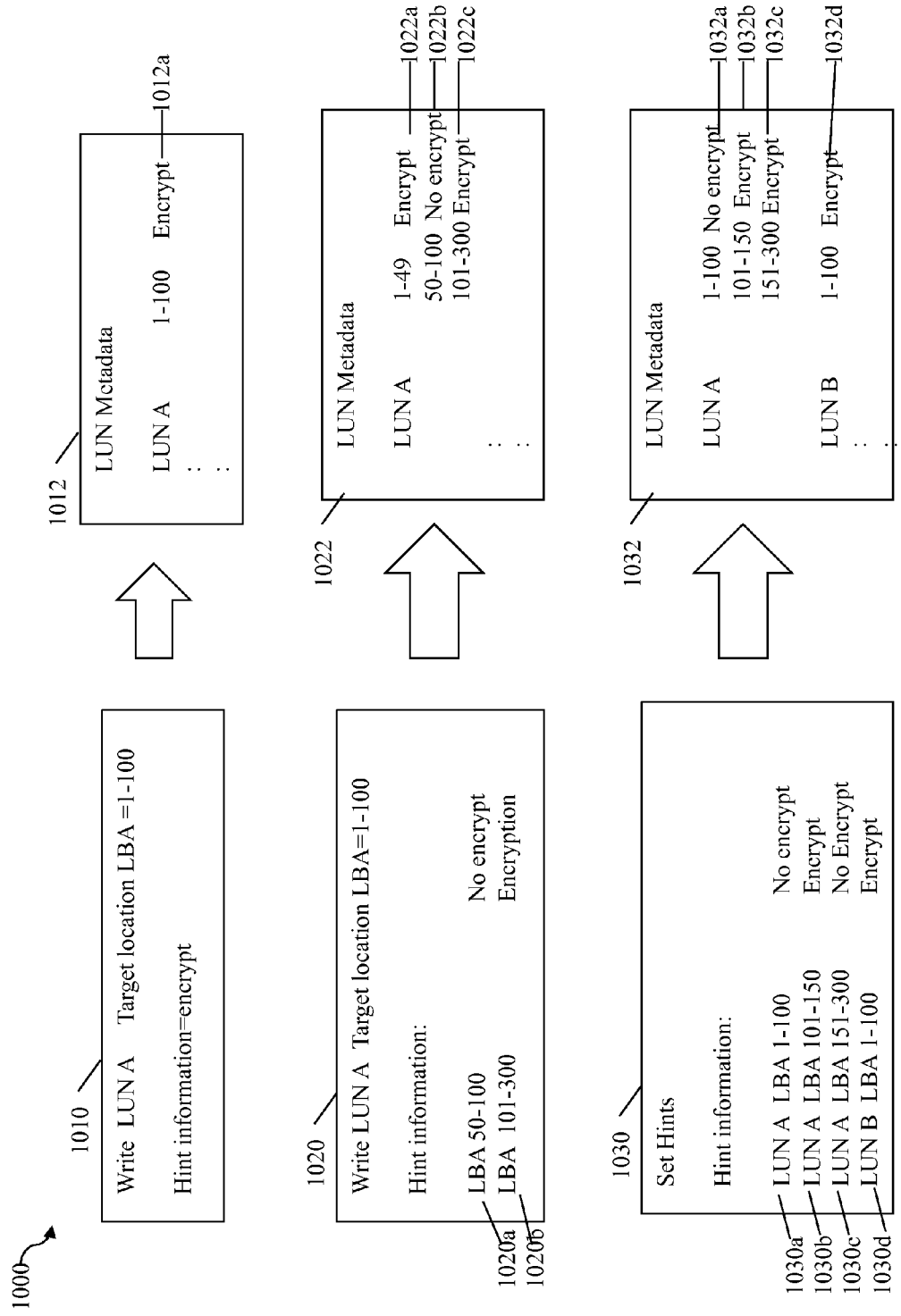
FIG. 13 is an example of a sequence of commands and associated metadata of the data storage system in an embodiment in accordance with techniques herein.

Referring to FIG. 13, shown is an example illustrating use of techniques herein with a sequence of several commands that may be issued from the host to the data storage system in an embodiment in accordance with techniques herein. The example 1000 includes a first command 1010 that may be sent from the host to the data storage system to write data to LUN A at LBA range 1-100. The hint information of the write command 1010 may simply indicate to store data in an encrypted form on the data storage system. Command 1010 is an example illustrating use of an implied LUN and LBA range of a hint target location. The data storage system receives command 1010 and stores metadata for data portion of LUN A as illustrated by 1012 as a first point in time denoting 1012a to encrypt data portions of LUN A, 1-100.

At a second point in time (subsequent to the first point in time), the host may send a second command 1020 to the data storage system to once again write information to LUN A, LBA range 1-100. However, command 1020 is an example of a write command including explicitly specified hint target locations. Element 1020a is a first set of hint information of command 1020 indicating that LUN A, LBA 50-100 is not required to be stored in an encrypted form. Element 1020b is a second set of hint information of command 1020 indicating that LUN A, LBA 101-300 is to be stored in encrypted form. Elements 1020a-b are examples of hint information in which the LBA range is explicitly specified and the LUN is implied to be the same as that of the write command since no LUN is identified in 1020a and 1020b. The data storage system receives command 1020 and updates the LUN metadata information 1022 to indicate that LUN A, LBA 1-49 is to be stored in an encrypted form (as in 1022a), to indicate that LUN A LBA 50-100 is not required to be stored in an encrypted form (as in 1022b) and the indicate that LUN A, LBA 101-300 is to be stored in an encrypted form (as in 1022c). It should be noted that LBA ranges of LUNs not denoted as requiring encryption may by default not require storage in an encrypted form. Accordingly, the data storage optimizer or data movement module may perform processing to move data portions between SED and non-SED-based storage tiers based on updated metadata of 1022. For example, data portions such as LUN A, LBA 50-100, which had a change in metadata information from requiring to be stored in an encrypted form (as in 1012) to not requiring storage in encrypted form (as in 1022) may be moved from an SED-based tier to non-SED-based tier. In a similar manner, data portions such as LUN A, LBA 101-300, which had a change in metadata information from not requiring storage in an encrypted form (as in 1012) to requiring storage in encrypted form (as in 1022) may be moved from an SED-based tier to non-SED-based tier.

At a third point in time (subsequent to the second point in time), the host may send a third command 1030 to the data storage system. However, in this example the command 1030 is not a write command or more generally, is not an I/O command. Rather the command 1030 may be a non-I/O command which may be used to set or update hint information included in the command. Command 1030 may include the following 4 sets of hint information: element 1030a is a first set of hint information indicating the LUN A, LBA 1-100 is not required to be stored in encrypted form; element 1030b is a second set of hint information indicating the LUN A, LBA 101-150 is required to be stored in encrypted form; element 1030c is a third set of hint information indicating the LUN A, LBA 151-300 is not required to be stored in encrypted form; and element 1030d is a fourth set of hint information indicating the LUN B, LBA 1-100 is required to be stored in encrypted form. The data storage system receives command 1030 and updates the LUN metadata information 1032 to indicate that LUN A, LBA 1-100 is not required to be stored in an encrypted form (as in 1032a), to indicate that LUN A LBA 101-150 is required to be stored in an encrypted form (as in 1032b), to indicate that LUN A, LBA 151-300 is to be stored in an encrypted form (as in 1032c), and the indicate that LUN B, LBA 1-100 is to be stored in encrypted form. Accordingly, the data storage optimizer or data movement module may perform processing to move data portions between SED and non-SED-based storage tiers based on updated metadata of 1032.

In a manner similar to the command of 1030 which sets hint information using a non-I/O command, an embodiment may also include a get or read hint information command in which the host issues the command to the data storage system and the data storage system returns to the host hint information as may be stored in the data storage system's metadata. The read or get hint information command may allow the host to specify one or more particular LUN(s) and optionally associated LBA ranges and obtain corresponding hint information from the data storage system. For example, the read or get hint information command may specify LUNs and LBA ranges as with the set command 1030.

On the host side, examples have been described whereby hint information may be specified for a file, or portions of a file. More generally, techniques herein may be used in connection with any application level object or data entity mapped to physical storage on the data storage system. For example, techniques herein may be used for files, objects, file systems, shared directories, or any data portions of the foregoing. Such data entities may correspond to host-side entities that each map to, and have their data stored on, one or more LUNs and associated LBA range(s) of the data storage system. In this manner, the metadata maintained on the host may vary with such host-side data entities.

An embodiment may use different techniques in connection with specifying an amount of time an encryption hint remains in effect, or until the hint information expires. For example, a hint on the host and data storage system may stay in effect until another hint is subsequently received which changes an existing set of hint information. In this case, a hint may remain in effect an indefinite amount of time.

As a variation, the amount of time a hint remains in effect may be understood implicitly by the sender and receiver of the encryption hint. For example, it may be understood that the encryption hint will remain in use or effect on the host and/or data storage system for a predetermined amount of time. For example, hint information as used by the host and data storage system may remain in effect for a time period based on when the command is sent by the host. If the encryption hint is to remain in effect for a predetermined amount of time based on when the command including the hint is sent from the host, the command may also include a time stamp denoting a date and time as to when the command was sent by the host. The data storage system may then use the time stamp as the starting time whereby the encryption hint remains in effect or expires at starting time+predetermined amount of time. As described above, the predetermined time representing a delta amount of time (added to the starting time included in the command) may be implicitly understood by both host and data storage system. As a further variation, the delta amount of time may alternatively be explicitly included in the command along with the timestamp and hint. As yet a further variation, the command may include a single expiration or ending time (rather than the time stamp or starting time and delta amount of time) along with the hint. In this last case, the host may determine the expiration or ending time communicated to the data storage system along with the hint in the command. Such information regarding the amount of time the encryption hint remains in effect may be included in the header of the same command including the hint or, more generally, otherwise communicated between the host and data storage system using any suitable means. With reference back to FIGS. 11 and 12, information such as the timestamp, delta time, and/or expiration time just described may be included in the additional hint information (e.g., 966 of FIGS. 12 and 906 of FIG. 11) of the command header.

It may be possible for the data storage system to receive a write command to write data for a data portion that is required to be encrypted where, however, there is an insufficient amount of physical storage available in a storage tier having the SED property (e.g., where the data portions are stored on devices of the tier are stored in encrypted form on the drive). The data storage system may take one or more actions in response to determining that there is an insufficient amount of physical storage available in a tier having the encryption property. For example, as a first option, the data storage system may fail the write operation if there is an insufficient amount of storage in a tier having the encryption property to store the write data. As a second option, the data storage system may attempt to relocate data from an SED-based tier to a non-SED based tier in an attempt to free or increase the amount of available storage in the SED tier. Such attempts still may not result in a sufficient amount of storage in the SED tier. If there is still an insufficient amount of free storage in the SED-based tier and the metadata for the data portion indicates that such write data is required to be stored in encrypted form on the data storage system, the write may then fail.

As yet another alternative when there is insufficient free or available storage in an SED tier and the data portion's metadata requires storing data written to the data portion in an encrypted form, rather than fail the write operation, the data storage system may trigger use of a software-based encryption algorithm to encrypt the write data and store the write data in an encrypted form such as on a physical drive of a storage tier that does not include the encryption attribute or property. The encrypted data may then be moved at a later time to a storage tier having the encryption property once storage becomes available in such a tier. The foregoing use of software encryption may be viewed as a temporary or secondary measure taken for a limited amount of time or only for a limited amount of data. For example, if the data storage system has to use the secondary measure of software encryption due to insufficient amount of physical storage available on SED-based tiers more than a threshold number of times within a particular time period, or for more than a threshold amount of data, the data storage system may fail the write. If such threshold conditions are exceeded, it may indicate a larger problem with data storage configuration and/or resources requiring the attention of the data storage administrator. For example, the administrator may need to purchase additional SED drives for inclusion in the storage tiers having data stored on its physical devices in encrypted form. The foregoing are examples of suitable actions that may be taken in response to determining an insufficient amount of physical storage available in an SED-based tier. A policy on the data storage system may be used to specify what actions should be taken under such circumstances, specify any thresholds, and the like, consistent with the foregoing description.

Consistent with description elsewhere herein, if the data is to be written to a location indicating that encryption is a preference rather than a requirement and there is currently an insufficient amount of storage in an SED-based tier, the write may not be failed. Rather, the write data may be first stored to a physical drive of a first tier having the no encryption property (whereby the data is stored in an unencrypted form) and then later moved to a second tier having the encryption property (whereby the data is then stored in an encrypted form) once storage becomes available in the second tier.

A data storage system may perform data services such as in connection with a LUN. Such data services may include, for example, making a logical copy of a LUN such as with a snapshot, creating a bit for bit physical duplicate copy of the LUN (such as with replication or data backups), and the like. Any data services may be performed in accordance with the particular metadata denoting requirements and/or preferences as to whether to store the different LUN portions in encrypted form. For example, metadata denoting requirements and/or preferences as to whether to store the different LUN portions in encrypted form may be populated or propagated with any copies of LUN data when performing services such as replication.

Figure 14:
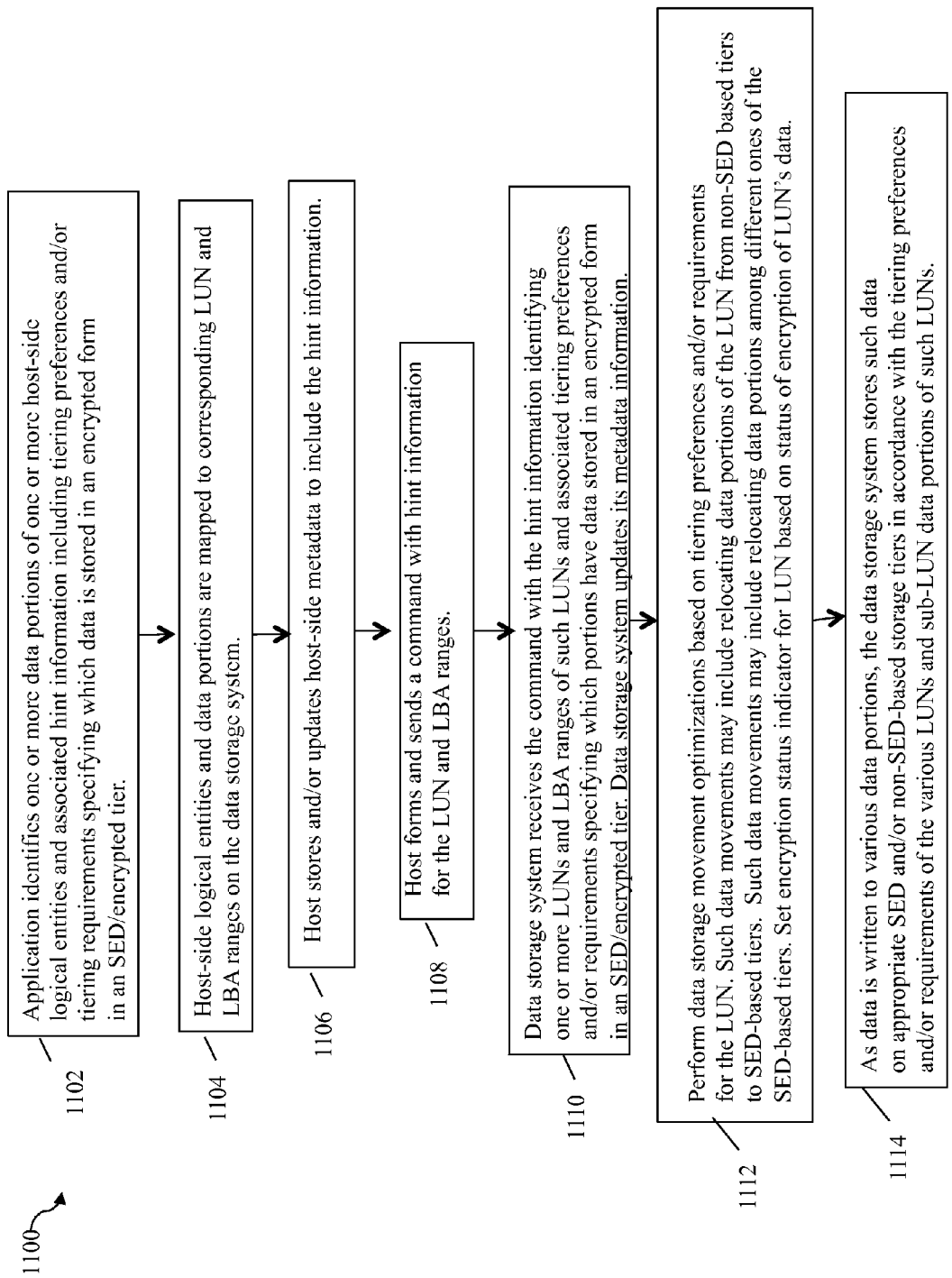

Referring to FIG. 14, shown is a flowchart of processing steps that may be performed in an embodiment in accordance with techniques herein. The flowchart 1100 summarizes processing described above. At step 1102, an application identifies one or more data portions of one or more host-side logical entities and associated hint information including tiering preferences and/or tiering requirements specifying which data is stored in an encrypted form in an SED/encrypted tier. At step 1104, the host-side logical entities and data portions are mapped to corresponding LUN and LBA ranges of the data storage system. At step 1106, the host stores and/or updates host-side metadata to include the hint information. At step 1108 the host forms and sends a command with the hint information for the LUN and LBA ranges determined in step 1104. At step 1110, the data storage system receives the command with the hint information identifying one or more LUNs, LBA ranges of such LUNs and associated tiering preferences and/or requirements specifying which data portions have data stored in an encrypted form in an SED/encrypted tier. The data storage system may accordingly update metadata for the identified LUN and data portions in the received command. As described herein, the hint information may be included an I/O command or a non-I/O command. If the hint information is included in an I/O command, step 1110 may also include writing any data in accordance with currently specified hint information and metadata stored on the data storage system denoting tieing preferences and/or requirements. At step 1112, the data storage movement optimizer may perform data movement optimizations based on tiering preferences and/or requirements for the sub-LUN data portions. Such data movements may include relocating data portions of the LUN from non-SED-based tiers to SED-based tiers. Such data movements may also include relocating data portions among different ones of the SED-based tiers in accordance with the varying activity levels of the data portions at different points in time. It should be noted that an embodiment may perform such data movements as a background process to minimize any adverse impact on active I/Os to the LUNs. At step 1114, as write data operations are received at the data storage system, write data is stored on appropriate SED and/or non-SED-based storage tiers in accordance with the metadata specifying tiering preferences and/or requirements of the various LUNs and sub-LUN data portions of such LUNs.

It should be noted that the processing of FIG. 14 illustrates a single sequence of specifying hint information and then using such hint information to determine whether to store newly written data on SED or non-SED tiers and whether to perform automated data movement between storage tiers. However, as will be appreciated by those skilled in the art, such processing may be repeated as additional hint information is specified and communicated from the host to the data storage system, as additional data is written, and the like. Additionally, as described herein, hint information may be included in a command which may or may not also perform I/O, such as write data, to the data storage system.

In summary, described herein are techniques that may be used to identify and communicate to the data storage system what data portions, such as at the sub-LUN level, are to be stored on SED-based tiers and/or non-SED-based tiers. In practical use in some embodiments, not all data portion of a LUN need to be encrypted. Using techniques herein, tiering preferences and/or tiering requirements may be specified at a sub-LUN level by the host to thereby indicate what data portions should be stored in an encrypted form on the data storage system. An embodiment in accordance with techniques may, for example, leverage application hinting and I/O tagging specified for other purposes by expanding or extending use of hints to also communicate hints indicating whether to store data portions in encrypted form. In accordance with techniques herein, a user or an application on the host may identify such data portions to be encrypted or not encrypted. Applications may communicate such information through the runtime I/O stack to the data storage systems. The storage systems may then selectively write data portions to SEDs based on encryption classification information of the data as communicated from the application/host. For example, a user of an application may choose to encrypt his/her financial statement files, and file system receiving the request may further communicate to the file system and other lower layers in the runtime I/O stack that such files, file blocks, and the like, need to be encrypted. The host may identify what data portions are to be encrypted. Such identification may be communicated from the host in a first command prior to a second command that actually writes the data. Such identification by the host may be communicated in the same command as the command that writes the data to be encrypted. The storage system may store hint information as metadata and may accordingly store and data written in accordance with its current set of hint information. When the storage system performs processing, such as for data movement in connection with automatic storage tiering, defragmentation, data replication for protection, or change data mapping for deduplication, the storage system may perform such processing in accordance with its current set of hint information such as may be stored as metadata. For example, if metadata for a data portion indicates that the data of the portion is required to be stored in an encrypted form on SED-based storage, the storage system may perform data movements for the data portion between storage tiers having the SED-based attribute or property. Techniques herein provide flexibility and capability to encrypt data on demand. Techniques herein provide improved data access performance and increase the storage system's overall storage efficiency. Using such techniques, a storage administrator may not have to decide if a LUN, or its data portion(s), require encryption or not. Whether to encrypt one or more data portions may be defined and specified by software on the host, such as by the application, and communicated to the storage system in the form of hints as described herein. Such techniques provide for simplified data management and encryption protection of sensitive application data.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of storing data comprising:
issuing a command from a client to a data storage system, said data storage system including a plurality of storage tiers comprising a first storage tier of physical storage devices and a second storage tier of physical storage devices, wherein data stored on any physical storage device of the first storage tier is stored in an encrypted form and data stored on any physical storage device of the second storage tier is not stored in an encrypted form, said command including a hint and specifying a first logical address range of a first logical device, wherein the hint is applied to data stored at the first logical address range of the first logical device and the hint indicates whether data stored at the first logical address range of the first logical device is stored in an encrypted form;
receiving said command at the data storage system;
storing first data written by an operation to said first logical device in said first logical address range on one or more physical storage devices of any of said first storage tier and said second storage tier in accordance with said hint; and
responsive to the hint indicating to store the first data in an encrypted form and the first storage tier having insufficient available storage to store the first data, performing processing including:
determining whether the first storage tier has had insufficient available storage for storing data written more than a threshold number of times in a time period; and
responsive to determining the first storage tier has had insufficient available storage for storing data written more than a threshold number of times in the time period, failing the operation to store the first data, and otherwise performing other processing including:
  writing the first data in encrypted form on a physical storage device of the second storage tier; and
  responsive to sufficient storage in the first storage tier being available to store the first data, relocating the first data from the second storage tier to the first storage tier.

2. The method of claim 1, wherein said first data is included in the command and the command is a write command to write the first data to a target location that is the first logical address range of the first logical device whereby the target location of the write command is implicitly used as a hint target location of the hint indicating whether data stored at the hint target location is stored in an encrypted form.

3. The method of claim 1, wherein the hint of the command explicitly specifies the first logical address range of the first logical device, the first data is not included in the command, and wherein the first data is write data of a second command that is a write command.

4. The method of claim 1, wherein the hint identifies any of a tiering requirement and tiering preference for data stored in the first logical address range of the first logical device.

5. The method of claim 1, wherein the first logical address range is less than an entire logical address range for the first logical device.

6. The method of claim 5, wherein the entire logical address range of the first logical device is partitioned into a plurality of portions, each of said plurality of portions being associated with a setting denoting any of a tiering requirement and tiering preference indicating whether data stored at said each portion is stored on one or more physical storage devices of a storage tier that stores data in an encrypted form.

7. The method of claim 1, wherein the client is a host and the hint is produced by an application that writes data to the first logical address range of the first logical device whereby the hint indicates that data written to the first logical address range of the first logical device is stored in an encrypted form and the data storage system stores the first data written to one or more locations in the first logical address range on one or more physical storage devices of the first storage tier.

8. The method of claim 7, wherein the first logical address range of the first logical device is included in a logical object to which the application performs data operations.

9. The method of claim 8, wherein the object is any of a file, a file system, and a directory.

10. The method of claim 1, wherein the hint explicitly specifies the first logical address range of the first logical device.

11. The method of claim 1, wherein the physical storage devices of the first storage tier are self encrypting drives providing for automatic encryption of data written to any of the physical storage devices of the first storage tier and automatic decryption of data read from any of the physical storage devices of the first storage tier.

12. The method of claim 1, wherein the hint of the command indicates to store data of the first logical address range of the first logical device in encrypted form and the data storage system stores the first data on a first physical storage device of the first storage tier and the method further comprising:
  receiving at the data storage system, at a subsequent point in time after storing the first data on the first physical device, a second command including a second hint indicating that data stored in the first logical address range of the first logical device is not stored in encrypted form; and
  responsive to receiving the second command, relocating any data stored on the first physical storage device of the first storage tier to a second physical storage device of the second tier.

13. The method of claim 1, wherein the hint is included in a header portion of the command.

14. The method of claim 1, wherein the hint indicates to store the first data in an encrypted form and there is insufficient available storage in the first storage tier to store the first data on one or more physical devices of the first storage tier, and the method further comprises:
  performing an action in accordance with a policy defined on the data storage system.

15. The method of claim 14, wherein the policy indicates to perform the action that includes any of: the processing and second processing.

16. The method of claim 15, wherein the second processing includes relocating other data from the first storage tier to the second storage tier to thereby increase an amount of available storage on the first storage tier.

17. The method of claim 1, wherein said hint is effective for a period of time indicated by said command.

18. The method of claim 1, wherein said hint is effective for said first logical address range of said first logical device until another hint is subsequently received that specifies new hint information indicating whether data stored at the first logical address range of the first logical device is stored in an encrypted form.

19. A data storage system comprising:
  a plurality of storage tiers including a first storage tier of physical storage devices and a second storage tier of physical storage devices, wherein data stored on any physical storage device of the first storage tier is stored in an encrypted form and data stored on any physical storage device of the second storage tier is not stored in an encrypted form; and
  a memory comprising code stored therein that, when executed, performs a method of storing data comprising:
    receiving a command from a client, said command including a hint and specifying a first logical address range of a first logical device, wherein the hint is applied to data stored at the first logical address range of the first logical device and the hint indicates whether data stored at the first logical address range of the first logical device is stored in an encrypted form;
    storing first data written by an operation to said first logical device in said first logical address range on one or more physical storage devices of any of said first storage tier and said second storage tier in accordance with said hint; and
    responsive to the hint indicating to store the first data in an encrypted form and the first storage tier having insufficient available storage to store the first data, performing processing including:
      determining whether the first storage tier has had insufficient available storage for storing data written more than a threshold number of times in a time period; and
      responsive to determining the first storage tier has had insufficient available storage for storing data written more than a threshold number of times in the time period, failing the operation to store the first data, and otherwise performing other processing including:
  writing the first data in encrypted form on a physical storage device of the second storage tier; and
  responsive to sufficient storage in the first storage tier being available to store the first data, relocating the first data from the second storage tier to the first storage tier.

20. A non-transitory computer readable medium comprising code stored thereon that, when executed, performs a method for storing data comprising:
  issuing a command from a client to a data storage system, said data storage system including a plurality of storage tiers comprising a first storage tier of physical storage devices and a second storage tier of physical storage devices, wherein data stored on any physical storage device of the first storage tier is stored in an encrypted form and data stored on any physical storage device of the second storage tier is not stored in an encrypted form, said command including a hint and specifying a first logical address range of a first logical device, wherein the hint is applied to data stored at the first logical address range of the first logical device and the hint indicates whether data stored at the first logical address range of the first logical device is stored in an encrypted form;
  receiving said command at the data storage system;
  storing first data written to said first logical device in said first logical address range on one or more physical storage devices of any of said first storage tier and said second storage tier in accordance with said hint; and
  responsive to the hint indicating to store the first data in an encrypted form and the first storage tier having insufficient available storage to store the first data, performing processing including:
    determining whether the first storage tier has had insufficient available storage for storing data written more than a threshold number of times in a time period; and
    responsive to determining the first storage tier has had insufficient available storage for storing data written more than a threshold number of times in the time period, failing the operation to store the first data, and otherwise performing other processing including:
      writing the first data in encrypted form on a physical storage device of the second storage tier; and
      responsive to sufficient storage in the first storage tier being available to store the first data, relocating the first data from the second storage tier to the first storage tier.

* * * * *